United States Patent
Kandekar et al.

(10) Patent No.: US 8,750,313 B1
(45) Date of Patent: Jun. 10, 2014

(54) MESSAGE PROPAGATION IN A DISTRIBUTED VIRTUAL WORLD

(75) Inventors: Kunal Kandekar, Raleigh, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 153 days.

(21) Appl. No.: 13/370,583

(22) Filed: Feb. 10, 2012

Related U.S. Application Data

(62) Division of application No. 11/693,152, filed on Mar. 29, 2007, now Pat. No. 8,135,018.

(51) Int. Cl.
*H04L 12/28* (2006.01)
*H04L 29/12* (2006.01)

(52) U.S. Cl.
CPC ...... *H04L 29/12066* (2013.01); *H04L 61/1511* (2013.01)
USPC .................................................. 370/395.31

(58) Field of Classification Search
CPC ....................... H04L 29/12066; H04L 61/1511
USPC .................................................. 370/395.31
See application file for complete search history.

(56) References Cited

U.S. PATENT DOCUMENTS

| | | | |
|---|---|---|---|
| 5,109,483 | A | 4/1992 | Baratz et al. |
| 5,838,909 | A | 11/1998 | Roy et al. |
| 5,940,504 | A | 8/1999 | Griswold |
| 5,956,038 | A | 9/1999 | Rekimoto |
| 6,285,380 | B1 | 9/2001 | Perlin et al. |
| 6,329,986 | B1 | 12/2001 | Cheng |
| 6,499,035 | B1 | 12/2002 | Sobeski |
| 6,577,328 | B2 | 6/2003 | Matsuda et al. |
| 6,604,134 | B2 | 8/2003 | Haury |
| 6,746,332 | B1 | 6/2004 | Ing et al. |

(Continued)

FOREIGN PATENT DOCUMENTS

| | | |
|---|---|---|
| EP | 0614139 A2 | 9/1994 |
| EP | 1536612 A1 | 6/2005 |
| WO | 9325962 A1 | 12/1993 |
| WO | 9847091 A1 | 10/1998 |
| WO | 0042555 A1 | 7/2000 |
| WO | 0072169 A1 | 11/2000 |
| WO | 03081447 A1 | 10/2003 |
| WO | 2007011752 A2 | 1/2007 |
| WO | 2007124590 A1 | 11/2007 |

OTHER PUBLICATIONS

Akkawi, Amjad et al., "A Mobile Gaming Platform for the IMS," NetGames, Copyright: 2004, 8 pages, http://conferences.sigcomm.org/sigcomm/2004/workshop_papers/net501-akkawi.pdf.
Author Unknown, "About This Site—Thottbot: World of Warcraft," Thottbot, obtained Feb. 27, 2009, 2 pages, http://thottbot.com/about.
Author Unknown, "Allakhazam.com Blog," Allakhazam, obtained Feb. 27, 2009, 18 pages, http://www.allakhazam.com/.
Author Unknown, "Congestion Avoidance Overview", Cisco IOS Quality of Service Solutions Configuration Guide, Release 12.2, Copyright 2009, pp. QC175-QC188.

(Continued)

*Primary Examiner* — Dang Ton
*Assistant Examiner* — Nourali Mansoury
(74) *Attorney, Agent, or Firm* — Withrow & Terranova, PLLC

(57) ABSTRACT

A message propagation scheme for a distributed virtual world is provided. In general, each of a number of peer servers hosts a cell of the virtual world, where the cell is also referred to herein as a virtual space. A peer server issues an advertisement/subscription (ad/sub) message, or message flow path setup message, identifying message types produced by the virtual objects in the virtual space hosted by the peer server and message types consumed by the virtual objects in the virtual space hosted by the peer server. Based on the ad/sub message, for each message type produced, message flow paths from the peer server to other peer servers hosting virtual objects that are consumers of the message type are identified. Likewise, for each message type consumed, message paths from other peer servers hosting virtual objects that are producers of the message type to the peer server are identified.

18 Claims, 14 Drawing Sheets

(56) References Cited

U.S. PATENT DOCUMENTS

| | | | |
|---|---|---|---|
| 6,767,287 B1 | 7/2004 | Mcquaid et al. | |
| 6,912,565 B1 | 6/2005 | Powers et al. | |
| 6,951,516 B1 | 10/2005 | Eguchi et al. | |
| 7,065,553 B1 | 6/2006 | Chesley et al. | |
| 7,089,278 B1 | 8/2006 | Churchill et al. | |
| 7,101,284 B2 | 9/2006 | Kake et al. | |
| 7,133,368 B2 | 11/2006 | Zhang et al. | |
| 7,181,690 B1 | 2/2007 | Leahy et al. | |
| 7,244,181 B2 | 7/2007 | Wang et al. | |
| 7,245,620 B2 | 7/2007 | Shankar | |
| 7,269,632 B2 | 9/2007 | Edeker et al. | |
| 7,388,585 B2 | 6/2008 | Kristiansen | |
| 7,421,708 B2 | 9/2008 | Vass et al. | |
| 7,437,733 B2 | 10/2008 | Manzano | |
| 7,493,558 B2 | 2/2009 | Leahy et al. | |
| 7,512,071 B2 | 3/2009 | Goldschmidt et al. | |
| 7,647,306 B2 | 1/2010 | Rose et al. | |
| 7,685,224 B2 | 3/2010 | Nye | |
| 7,688,761 B2 | 3/2010 | Paramaguru | |
| 7,814,153 B2 | 10/2010 | Flesch et al. | |
| 7,831,707 B2 | 11/2010 | Bardsley | |
| 7,836,437 B2 | 11/2010 | Kacmarcik | |
| 7,843,876 B2 | 11/2010 | Holt et al. | |
| 8,005,850 B2 | 8/2011 | Walther et al. | |
| 2001/0040895 A1 | 11/2001 | Templin | |
| 2001/0052008 A1 | 12/2001 | Jacobus | |
| 2002/0066022 A1 | 5/2002 | Calder et al. | |
| 2002/0188678 A1 | 12/2002 | Edecker et al. | |
| 2003/0008712 A1 | 1/2003 | Poulin | |
| 2003/0014423 A1 | 1/2003 | Chuah et al. | |
| 2003/0115132 A1 | 6/2003 | Iggland | |
| 2003/0177187 A1 | 9/2003 | Levine et al. | |
| 2004/0002342 A1 | 1/2004 | Goldberg et al. | |
| 2004/0078800 A1 | 4/2004 | Manzano | |
| 2004/0152519 A1 | 8/2004 | Wang et al. | |
| 2004/0201626 A1 | 10/2004 | Lavoie et al. | |
| 2004/0215756 A1 | 10/2004 | VanAntwerp et al. | |
| 2005/0054447 A1 | 3/2005 | Hiroyama et al. | |
| 2005/0120073 A1 | 6/2005 | Cho | |
| 2005/0171997 A1 | 8/2005 | Seo et al. | |
| 2005/0203922 A1 | 9/2005 | Uhlir et al. | |
| 2005/0280661 A1 | 12/2005 | Kobayashi et al. | |
| 2006/0095763 A1 | 5/2006 | Iyengar et al. | |
| 2006/0123127 A1 | 6/2006 | Littlefield | |
| 2007/0021110 A1 | 1/2007 | Chaudhri et al. | |
| 2007/0184903 A1 | 8/2007 | Liu et al. | |
| 2007/0186212 A1 | 8/2007 | Mazzaferri et al. | |
| 2007/0238520 A1 | 10/2007 | Kacmarcik | |
| 2007/0270225 A1 | 11/2007 | Wang et al. | |
| 2007/0271301 A1 | 11/2007 | Klive | |
| 2007/0288404 A1 | 12/2007 | Kacmarcik | |
| 2007/0288598 A1* | 12/2007 | Edeker et al. | 709/217 |
| 2007/0294387 A1 | 12/2007 | Martin | |
| 2008/0063002 A1 | 3/2008 | Zheng et al. | |
| 2008/0090659 A1* | 4/2008 | Aguilar et al. | 463/42 |
| 2008/0109519 A1 | 5/2008 | Aaltonen et al. | |
| 2008/0201321 A1 | 8/2008 | Fitzpatrick et al. | |
| 2008/0207327 A1 | 8/2008 | Van Luchene et al. | |
| 2009/0099824 A1 | 4/2009 | Falash et al. | |
| 2009/0124387 A1 | 5/2009 | Perlman et al. | |
| 2009/0172157 A1 | 7/2009 | Zhang | |
| 2010/0141648 A1 | 6/2010 | Bell et al. | |
| 2011/0213805 A1 | 9/2011 | Walther et al. | |

OTHER PUBLICATIONS

Author Unknown, "Dive Tutorial," SICS, Accessed Mar. 9, 2007, 8 pages, http://www.sics.se/dive/manual/tutorial/.
Author Unknown, "Microsoft Masthead Frame with Global Toolbar", Microsoft Corporation, Copyright: 2007, Retrieved Oct. 10, 2007, 3 pages http://www.microsoft.com/resources/documentation/windows/xp/all/proddocs/en-us/sag_liceconcepts_401.mspx?mfr=true.
Author Unknown, "Multiverse Technology: An Overview", The Multiverse Network, Inc., Copyright: 2005, 17 pages, http://www.multiverse.net/platform/whitepapers/mv_overview.pdf.
Author Unknown, "Public-Key Cryptography," Wikipedia—The Free Encyclopedia, Updated Mar. 17, 2007, Accessed Mar. 19, 2007, 12 pages, http://en.wikipedia.org/wiki/Public-key_cryptography.
Author Unknown, "Solipsis," Wikipedia—The Free Encyclopedia, Updated Feb. 1, 2007, Retrieved Mar. 19, 2007, 4 pages, http://en.wikipedia.org/wiki/Solipsis.
Author Unknown, "The Sky is Falling," Surrender, Mar. 9, 2008, 5 pages, http://stern.aen.walkerart.org/artifacts.html.
Author Unknown, "Uni-Verse & The Online Gaming Market," Uni-Verse, Copyright: 2007, 3 pages, http://www.uni-verse.org/On-Line-Gaming.49.0.html.
Author Unknown, "Uni-verse Home", Uni-Verse, Retrieved Jun. 15, 2007, 3 pages, www.uni-verse.org.
Author Unknown, "What is Second Life?," Second Life, obtained Feb. 27, 2009, 2 pages, http://secondlife.com/whatis/.
Author Unknown, Main Page—Solipsis, (website), obtained Feb. 6, 2007, 2 pages, http://solipsis.netofpeers.net/wiki2/index.php/Main_Page.
Author Unknwon, "About Us," Wowhead, obtained Feb. 27, 2009, 3 pages, http://www.wowhead.com/?aboutus.
Beskow, Paul B. et al., "Latency Reduction in Massively Multi-Player Online Games by Partial Migration of Game State," 2nd International Conference of Internet Technologies and Applications, Published: 2007, 10 pages.
Boulanger, Jean-Sébastien, "Comparing Interest Management Algorithms for Massively Multiplayer Games," Master's Thesis, McGill University, Published: 2006, 12 pages.
Chen, Alvin Yun-Wen, "A Hybrid Architecture for Massivel Scaled Distributed Virtual Environments," UCLA Multimedia Systems Laboratory, Published: 2006, 68 pages.
Crippa, M. et al., "Peer-to-Peer Support for Instance-Based Massively Multiplayer Games", Informatics Institute of Federal University of Rio Grande do Sul, Copyright: 2007, 4 pages.
De Oliveira, Jauvane C. et al., "Velvet: An Adaptive Hybrid Architecture for VEry Large Virtual EnvironmenTs," MIT Press Journal, Dec. 2003, v. 12, No. 6, 5 pages.
Karasuda, Eric et al., "Textual Annotation in a Head Tracked, Stereoscopic Virtual Design Environment," Proceedings of DETC'04 2004 ASME Design Engineering Technical Conferences, Sep. 29, 2004, 10 pages, Salt Lake City, Utah, USA.
Frécon, Emmanuel et al., "The Final COVEN Multi-User VR Platform—D1.4a, The Coven Dive Platform," COVEN—Collaborative Virtual Environments, Nov. 12, 1998, 49 pages, http://coven.lancs.ac.uk/4/deliverables/del14a.pdf.
Gauthierdickey, Chris et al., "Event Ordering and Congestion Control for Distributed Multiplayer Games", CitiSeerxb, May 14, 2005, 10 pages.
Gehrmann, H., "P2P Based Distributed Virtual Reality. TerraPeer—a DVE Architecture and Implementation," Institute of Informatics and Mathematical Modeling, Technical University of Denmark (DTU), Feb. 2004, 200 pages.
Geser, Hans, "A Very Real Virtual Society—Some Macrosociological Reflections on 'Second Life'," Sociology in Switzerland, May 2007, 27 pages, http://socio.ch/intcom/t_hgeser18,htm.
Hosseini, M. et al., "Visibility-based Interest Management in Collaborative Virtual Environments," Collaborative and Virtual Environments 2002 (CVE 2002), Published: 2002, 2 pages.
Hu, S. et al., "A Case for Peer-to-Peer 3D Streaming", Ascend Technical Report, Copyright: 2006, pp. 1-8.
Hu, Shun-Yun et al., "Scalable Peer-to-Peer Networked Virtual Environment," Proceedings of the 3rd ACM SIGCOMM 2004 Workshops on NetGames '04, Aug. 2004, 5 pages.
Hu, Shun-Yun et al., "VON: A Scalable Peer-to-Peer Network for Virtual Environments," IEEE Network, Jul./Aug. 2006, vol. 20, issue 4, pp. 22-31.
Hu, Shun-Yun, "A Case for 3D Streaming on Peer-to-Peer Networks", Department of Computer Science and Information Engineering, National Central University, Copyright: 2006, 7 pages, Taiwan.
Iimura, Takuji et al., "Zoned Federation of Game Servers: a Peer-to-Peer Approach to Scalable Multi-Player Online Games," Proceedings of the 3rd ACM SIGCOMM 2004 workshops on NetGames '04, Aug. 2004, 64 pages.

(56) References Cited

OTHER PUBLICATIONS

Kazem, Ihab et al., "A Visibility-Driven Approach to Managing Interest in Distributed Simulations with Dynamic Load Balancing," 11th IEEE Symposium on Distributed Simulation and Real-Time Applications, IEEE Computer Society, Nov. 19, 2007, pp. 31-38.

Knutsson, Bjorn et al., "Peer-to-Peer Support for Massively Multiplayer Games," The 23rd Conference of the IEEE Communications Society (INFOCOM '04), Mar. 2004, 12 pages, Hong Kong, China.

Powell, Dan, "What Are the Best Second Life Resources for Communications—Driven Decision Support?," Ask Dan! About DSS, Aug. 19, 2007, 6 pages, http://dssresources.com/faq/index.php?action=artikel&id=139.

Schmalstieg, D. et al., "Sewing Worlds Together With Seams: A Mechanism to Construct Complex Virtual Environments," Austrian Science Foundation (FWF), Published: 1999, 16 pages.

Smed, Jouni et al., "A Review on Networking and Multiplayer Computer Games," Turku Centre for Computer Science: Technical Report No. 454, Apr. 2002, 30 pages.

Tanin, E. et al., "A Serverless 3D World," Proceedings of the 12th Annual ACM International Workshop on Geographic Information Systems, Nov. 12-13, 2004, 9 pages, New York, NY.

Tanin, E. et al., "Building and Querying a P2P Virtual World," Geoinformatica, Mar. 2006, vol. 10, No. 1, Kluwer Academic Publishers, Hingham, MA, 22 pages.

Tumbde, Adwait et al., "A Voronoi Partitioning Approach to Support Massively Multiplayer Online Games," The University of Wisconsin, Published: 2004, 8 pages.

Youd, David, "What is a Digital Signature? An Introduction to Digital Signatures," Copyright: 1996, 5 pages, http://www.youdzone.com/signature.html.

Non-Final Office Action for U.S. Appl. No. 11/693,152, mailed Dec. 20, 2010, 13 pages.

Final Office Action for U.S. Appl. No. 11/693,152, mailed May 23, 2011, 13 pages.

Advisory Action for U.S. Appl. No. 11/693,152, mailed Sep. 13, 2011, 3 pages.

\* cited by examiner

MESSAGE PROPAGATION IN A DISTRIBUTED VIRTUAL WORLD

This application is a divisional of U.S. patent application Ser. No. 11/693,152 filed Mar. 29, 2007, the disclosure of which is incorporated herein by reference in its entirety.

FIELD OF THE INVENTION

The present invention relates to a distributed virtual world and more specifically relates to message propagation in a distributed virtual world.

BACKGROUND OF THE INVENTION

Decentralized Peer-to-Peer (P2P) virtual worlds are an emerging technology wherein a number of peer servers host virtual spaces within the virtual world. If virtual objects within the virtual world have auras and Areas of Interest (AOIs) that span multiple virtual spaces, messages such as event messages, content messages, and content update messages originating from virtual objects in a virtual space hosted by a peer server must be propagated to other peer servers hosting other virtual spaces in the virtual world in which the messages are relevant. Likewise, messages originating in virtual spaces hosted in other peer servers that are of interest to virtual objects within the virtual space hosted by the peer server must be propagated to the peer server. Thus, there is a need for a system and method for efficiently propagating messages in a decentralized P2P virtual world.

SUMMARY OF THE INVENTION

The present invention provides a message propagation scheme for a distributed virtual world such as a Peer-to-Peer (P2P) virtual world. In general, each of a number of peer servers hosts a cell of the virtual world, where the cell is also referred to herein as a virtual space. An interest expression for each virtual object within a virtual space hosted by a peer server is registered with the peer server. The interest expression of a virtual object includes a listing of message types consumed by the virtual object and their respective Areas of Interest (AOIs) and a listing of message types produced by the virtual object and their respective auras. Based on the interest expressions, the peer server issues an advertisement/subscription (ad/sub) message, or message flow path setup message, identifying message types produced by the virtual objects in the virtual space hosted by the peer server and message types consumed by the virtual objects in the virtual space hosted by the peer server. Based on the ad/sub message, for each message type produced by a virtual object in the virtual space hosted by the peer server, message flow paths from the peer server to other peer servers hosting virtual objects that are consumers of the message type are identified. Likewise, for each message type consumed by a virtual object in the virtual space hosted, by the peer server, message paths from other peer servers hosting virtual objects that are producers of the message type to the peer server are identified.

More specifically, the peer server, which is hereafter referred to as the "originating peer server," generates an ad/sub message including an advertisement record for each message type produced by one or more of the virtual objects in the virtual space hosted by the originating peer server and a subscription record for each message type consumed by one or more of the virtual objects in the virtual space hosted by the originating peer server. Each advertisement record may also include metadata or information describing the one or more virtual objects producing the corresponding message type or one or more references to such metadata or information or additional metadata or information at an external source. The subscription records may also include one or more criterion, in addition to the corresponding message types, identifying virtual objects or classes of virtual objects of interest to the originating peer server or consumers of the corresponding message type.

The originating peer server sends the ad/sub message to one or more of its neighboring peer servers, which are peer servers hosting neighboring cells of the virtual world. Based on a scope of each of the advertisement and subscription records in the ad/sub message, the neighboring peer servers may further propagate the ad/sub message, or a version of the ad/sub message filtered based on scope, to their neighboring peer servers. Propagation may continue based on the scope of each of the advertisement and subscription messages.

For each of the advertisement records in the ad/sub message, ones of the peer servers in receipt of the ad/sub message that host one or more virtual objects that are consumers of the corresponding message type and/or having one or more neighboring peer servers expressing an interest in the corresponding message type generate a response in order to subscribe to messages of the message type from the originating peer server. Based on the responses, for each message type produced by a virtual object hosted by the originating peer server, message flow paths from the originating peer node to other peer nodes hosting virtual objects that are consumers of the message type are identified. For each of the subscription records in the ad/sub message, message paths from the originating peer server to other peer servers hosting virtual objects producing the corresponding message type and sub-type are identified as the ad/sub message is propagated among the peer servers. Thereafter, the messages produced and consumed by the virtual objects in the virtual space hosted by the originating peer node are routed according to the established message flow paths. As a result, the messages are efficiently propagated among the peer servers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
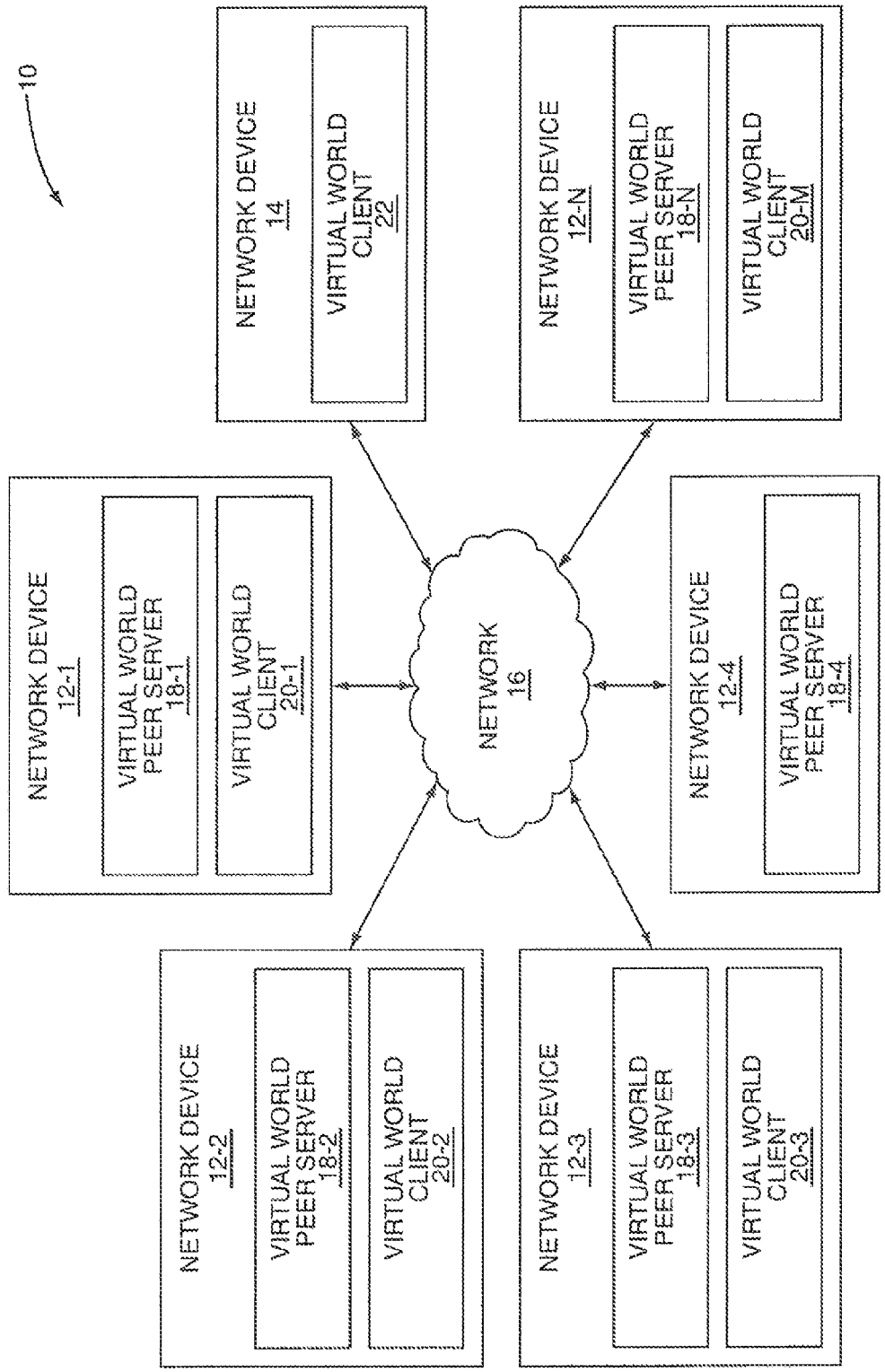
FIG. 1 illustrates a system for implementing a Peer-to-Peer (P2P) virtual world according to one embodiment of the present invention.
Figure 9:
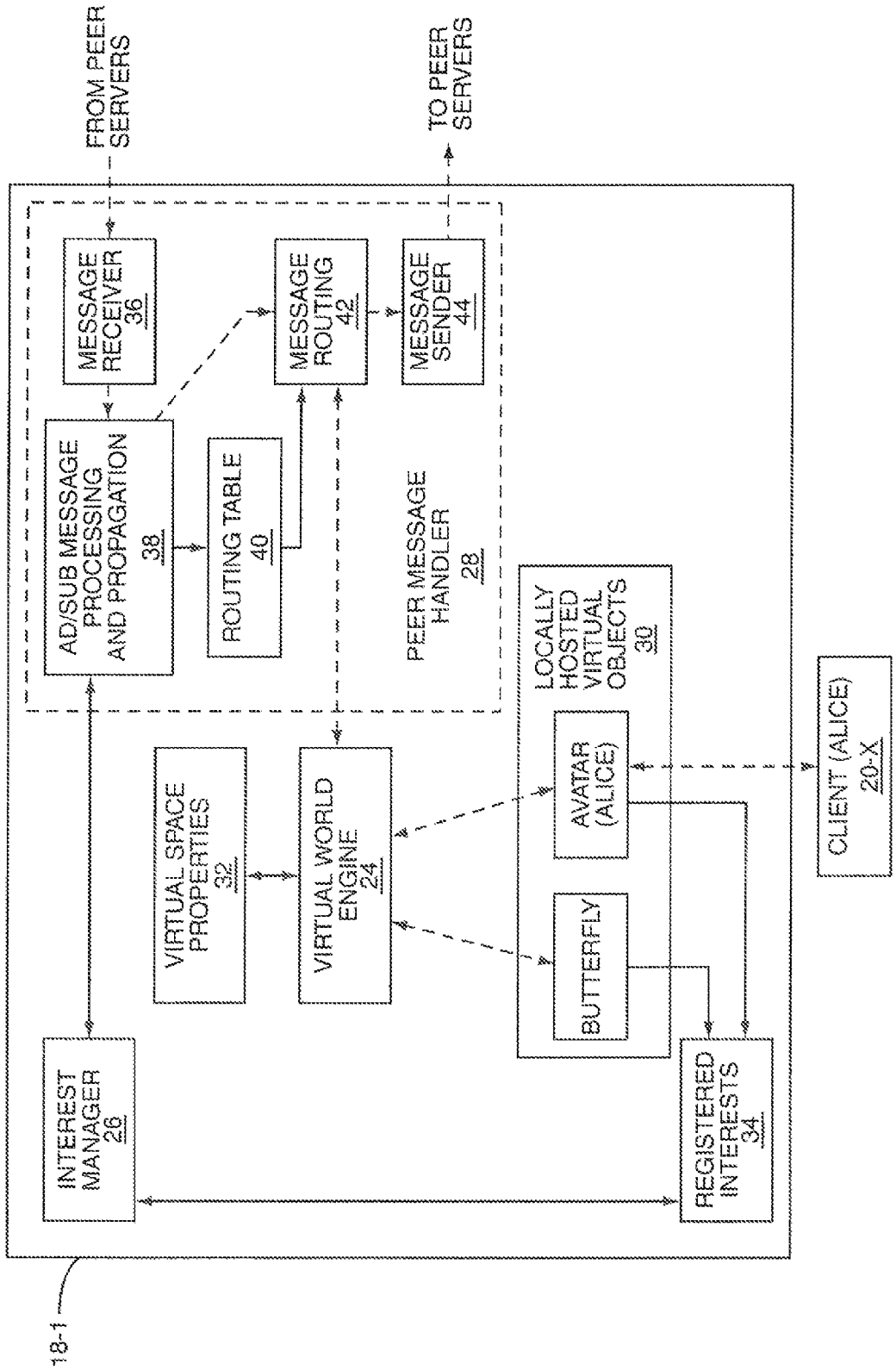
Figure 10:
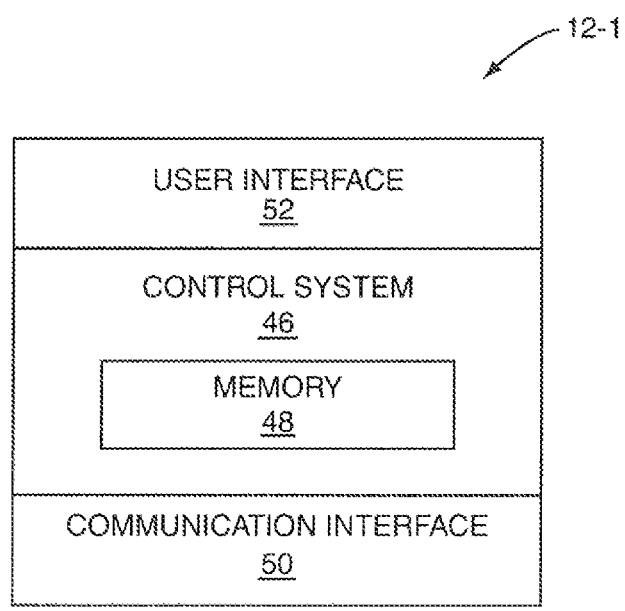

FIGS. 8A-8D graphically illustrate a process of issuing and responding to an ad/sub message in order to establish message flow paths for messages produced and consumed by virtual objects within a virtual space hosted by a peer server according to one embodiment of the present invention;

FIG. 9 is a block diagram of a peer server according to one embodiment of the present invention; and FIG. 10 is a block diagram of one of the network devices of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates an exemplary system 10 for implementing a Peer-to-Peer (P2P) virtual world incorporating the message propagation scheme of the present invention. The virtual world may be, for example, a virtual world similar to Second Life or a Massively Multiplayer Online Role Playing Game (MMORPG). It should be noted that while the description herein focuses on a P2P virtual world, the present invention is equally applicable to any type of distributed virtual world. In general, the system 10 includes a number of network devices 12-1 through 12-N and optionally 14 communicatively coupled by a network 16. The network 16 may be a Wide Area Network (WAN), Local Area Network (LAN), or a combination thereof and may include wired components, wireless components, or both wired and wireless components. For example, the network 16 may be the Internet. The network devices 12-1 through 12-N and 14 communicate in a P2P fashion via a P2P overlay network built on top of the network 16.

The network devices 12-1 through 12-N and 14 may each be, for example, a personal computer; a mobile device such as a Personal Digital Assistant (PDA) or mobile telephone; a mobile gaming device similar to a Nintendo DS® or PSP® (PlayStation Portable®); a gaming console; or the like. The network devices 12-1 through 12-N include virtual world peer servers 18-1 through 18-N (hereinafter "peer servers 18-1 through 18-N"). The peer servers 18-1 through 18-N may be implemented in software, hardware, or a combination thereof. As discussed below, each of the peer servers 18-1 through 18-N hosts a cell of the virtual world, where the cell is also referred to herein as a virtual space. Users associated with the peer servers 18-1 through 18-N may customize or create their virtual spaces by, for example, creating buildings, altering the terrain or landscape, defining weather or weather patterns, or the like. In one embodiment, a new cell is created for each of the peer servers 18-1 through 18-N when they are first registered with the system 10. When, for example, the peer server 18-1 is offline, the corresponding cell of the virtual world may cease to exist until the peer server 18-1 is again online. Alternatively, when the peer server 18-1 is offline, the cell of the virtual world typically hosted by the peer server 18-1 may be temporarily hosted by one of the other peer servers 18-2 through 18-N. In another embodiment, a central system assigns the cells of the virtual world to the peer servers 18-1 through 18-N. The assignment may be static such that, for example, the peer server 18-1 typically hosts a particular cell of the virtual world. When the peer server 18-1 is offline, the corresponding cell of the virtual world may cease to exist or be temporarily hosted by one of the other peer servers 18-2 through 18-N. As another alternative, the central system may dynamically assign the cells of the virtual world to the peer servers 18-1 through 18-N as they come online and go offline.

In this example, the network devices 12-1, 12-2, 12-3, and 12-N also include virtual world clients 20-1 through 20-M, which are hereafter referred to as clients 20-1 through 20-M. Note that, in this example, one or more network devices such as the network device 12-4 may include a peer server but not a client. The clients 20-1 through 20-M may be implemented in software, hardware, or a combination thereof. The clients 20-1 through 20-M enable users of the network devices 12-1, 12-2, 12-3, and 12-N to view and interact with the virtual world. More specifically, in the preferred embodiment, the users are enabled to control corresponding avatars to move within and interact with the virtual world.

In addition, in this example, the network device 14 includes a virtual world client 22, which is hereafter referred to as a client 22. Note that while only the network device 14 is illustrated, the system 10 may include any number of network devices having a client but not a peer server. The client 22 may be implemented in software, hardware, or a combination thereof. The client 22 enables a user of the network device 14 to view and interact with the virtual world.

Figure 2:
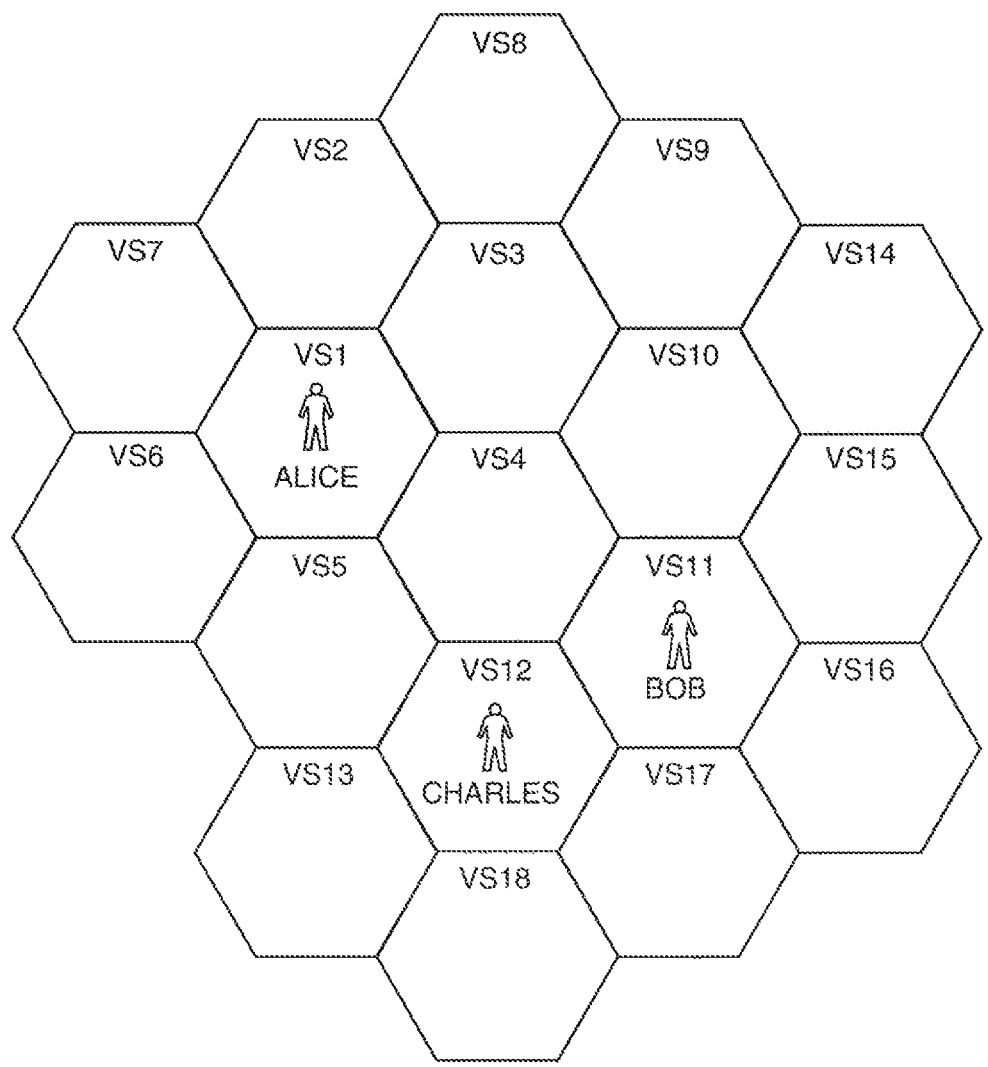
FIG. 2 illustrates a number of virtual spaces of the virtual world hosted by corresponding peer servers according to one embodiment of the present invention.

FIG. 2 illustrates a portion of the virtual world hosted by corresponding peer servers. In this example, eighteen cells, or virtual spaces, VS1-VS18 are illustrated, where each of the cells VS1-VS18 are hexagonally shaped and of equal size. However, the present invention is not limited thereto. Each of the virtual spaces of the virtual world may be any shape and size. In this example, an avatar of a user Alice is currently within the virtual space VS1, an avatar of a user Bob is currently within the virtual space VS11, and an avatar of user Charles is currently within the virtual space VS12.

Figure 3:
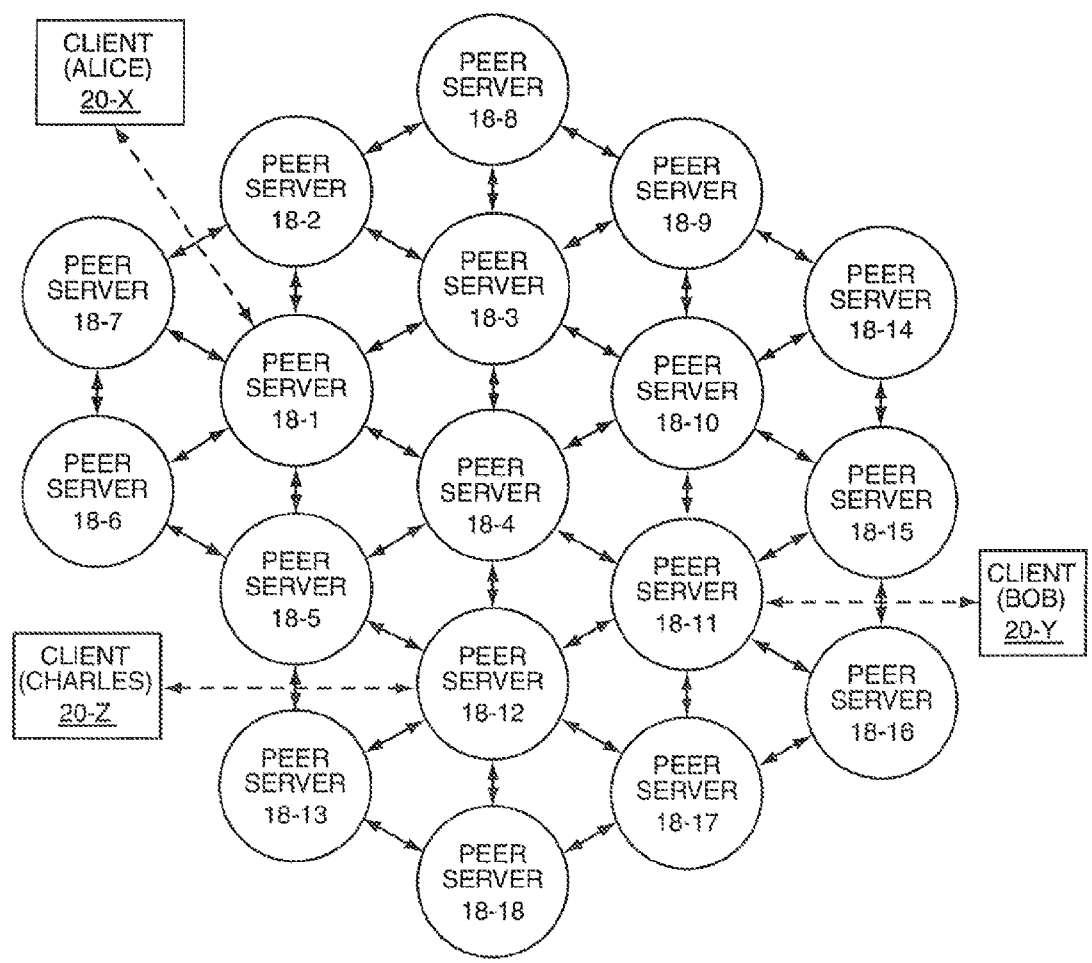
FIG. 3 illustrates a number of peer servers hosting the virtual spaces of FIG. 2 according to one embodiment of the present invention.

The virtual spaces VS1-VS18 are hosted by peer servers 18-1 through 18-18, which are illustrated in FIG. 3. The virtual space VS1 is hosted by the peer server 18-1, the virtual space VS2 is hosted by the peer server 18-2, etc. The peer servers 18-1 through 18-18 are communicatively coupled by the P2P overlay network as illustrated. Using the peer server 18-1 as an example, the peer server 18-1 is communicatively coupled to each of the peer servers 18-2 through 18-7 hosting neighboring virtual spaces VS2-VS7 in the virtual world via corresponding P2P communication channels. Note that the peer servers 18-2 through 18-7 are also referred to herein as the neighboring peer servers of the peer server 18-1. In a similar fashion, the peer servers 18-2 through 18-18 are communicatively coupled to their neighboring peer servers via P2P communication channels.

In addition, because the avatar of the user Alice is currently within the virtual space VS1, the corresponding client, which in this example is the client 20-X, is communicatively coupled to the peer server 18-1 hosting the virtual space VS1. While within the virtual space VS1, the client 20-X interacts with the virtual world via the peer server 18-1. Likewise, because the avatar of the user Bob is currently within the virtual space VS11, the corresponding client, which in this example is the client 20-Y, is communicatively coupled to the peer server 18-11 hosting the virtual space VS11. While within the virtual space VS11, the client 20-Y interacts with the virtual world via the peer server 18-11. Lastly, because the avatar of the user Charles is currently within the virtual space VS12, the corresponding client, which in this example is the client 20-Z, is communicatively coupled to the peer server 18-12 hosting the virtual space VS12. While within the virtual space VS12, the client 20-Z interacts with the virtual world via the peer server 18-12. Note that X, Y, and Z may each be any integer from 1 to M. Further, note, in another embodiment, one of the avatars may alternatively be associated with the client 22 of the network device 14.

If, for example, the user Alice moves her avatar from the virtual space VS1 to the virtual space VS2, the client 20-X disconnects from the peer server 18-1 hosting the virtual space VS1 and connects to the peer server 18-2 hosting the virtual space VS2. Then, while Alice's avatar is in the virtual space VS2, the client 20-X interacts with the virtual world via the peer server 18-2.

Figure 4:
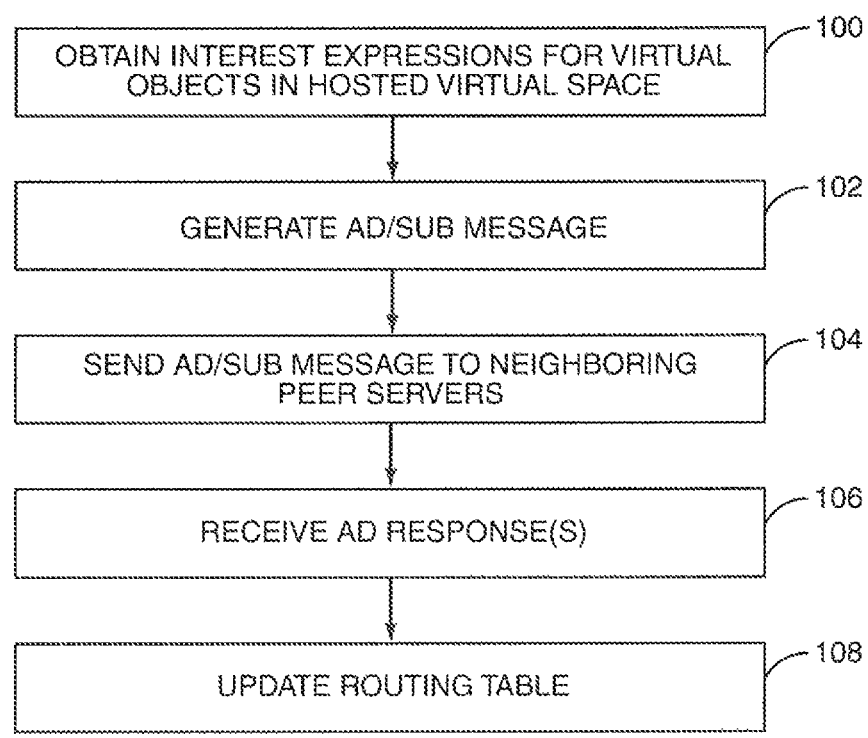
FIG. 4 illustrates the operation of a peer server issuing an advertisement/subscription (ad/sub) message according to one embodiment of the present invention.

FIG. 4 illustrates the operation of a peer server in establishing message flow according to one embodiment of the present invention. The peer server 18-1 is used as an example. First, the peer server 18-1 obtains interest expressions for each virtual object in its virtual space VS1 (step 100). An interest expression for a virtual object includes information identifying message types produced by the virtual object and corresponding Areas of Interest (AOIs) and information identifying message types consumed by the virtual object and corresponding auras. The aura and AOI may vary depending on message type. If so, the interest expression includes information defining the AOI of the virtual object with respect to each message type consumed by the virtual object and the aura of the virtual object with respect to each message type produced by the virtual object. Note that rather than including information explicitly defining an AOI for a message type, an interest expression may include information from which the AOI for the message type may be extrapolated. For, example, for visual messages from a virtual object such as a building, the interest expression may include information such as, for example, the size of the building. The AOI of the building with respect to the visual messages may then be extrapolated by the peer server 18-1 based on the size of the building or extrapolated by subsequent peer servers as messages related to the building are propagated. The ad/sub message may include information identifying the location of the building as well as the size of the building especially if, for example, the AOI is extrapolated by subsequent peer servers.

As used herein, aura is an area of the virtual world over which messages of a message type produced by a virtual object are relevant. For example, for messages of a visual type, a virtual object may have an aura corresponding to an area of the virtual world in which the virtual object can been seen. Likewise, for messages of an audio type, a virtual object may have an aura corresponding to an area of the virtual world in which sounds made by the virtual object can be heard. The aura of a message type may be expressed as, for example, a set of vectors each specifying a set of coordinates or a starting point, a direction, and a distance. The combination of the set of vectors using known geometric algorithms describes an area, which is the aura of the message type. As another example, in a virtual world that is a fractal generated maze, the aura may be expressed in terms of a starting point on the fractal and the limit to which the fractal equation should be applied from that point. Other ways to express the aura will be apparent to one of ordinary skill in the art upon reading this disclosure and are within the scope of the present invention.

Further, the manner in which the aura is expressed may vary depending on the characteristics of the virtual world.

In contrast, an AOI is an area of the virtual world relevant to a virtual object from a consumer perspective. For example, for an avatar consuming messages of a visual type, the AOI of the avatar may correspond to an area of the virtual world that can be seen by the avatar. Thus, the AOI may correspond to the line-of-sight of the avatar. The AOI of a message type may be expressed as, for example, a set of vectors each specifying a set of coordinates or a starting point, a direction, and a distance. The combination of the set of vectors using known geometric algorithms describes an area, which is the AOI of the message type. As another example, in a virtual world that is a fractal generated maze, the AOI may be expressed in terms of a starting point on the fractal and the limit to which the fractal equation should be applied from that point. Other ways to express the AOI will be apparent to one of ordinary skill in the art upon reading this disclosure and are within the scope of the present invention. Further, the manner in which the AOI is expressed may vary depending on the characteristics of the virtual world.

A message type may be, for example, an event message type, a content message type, or a content update message type. The message types may be further classified by sub-type. Thus, in one embodiment, a message type includes a primary message type and a sub-type. The primary message type may be, for example, an event message type, a content message type, or a content update message type. The sub-types may further define the message types. For example, a sub-type may be an audio sub-type, a visual sub-type, an avatar movement sub-type, a social interaction sub-type, or a virtual space state sub-type. Thus, messages related to avatar movement may be classified as the event/avatar movement message type. Likewise, messages related to weather conditions in a virtual space may be classified as the event/virtual space state message type.

In addition, custom message types may be defined for a virtual object. The custom message types may be particularly beneficial where users are enabled to customize virtual objects and/or the virtual spaces hosted by their associated peer servers 18-1 through 18-N.

The interest expressions for the virtual objects may be actively obtained by the peer server 18-1, provided to the peer server 18-1 from some source such as the virtual objects, known by the peer server 18-1 in advance, or any combination thereof. For example, for an avatar, the interest expression for the avatar may be provided to the peer server 18-1 by the client associated with the avatar or provided to the peer server 18-1 by the avatar itself. Alternatively, if the avatar just entered the virtual space hosted by the peer server 18-1 from the virtual space hosted by, for example, the peer server 18-2, the peer server 18-2 may provide the interest expression for the avatar to the peer server 18-1. In the case of static virtual objects or virtual objects that do not leave the virtual space of the peer server 18-1, the interest expressions for these virtual objects may be known to the peer server 18-1. The above examples are not intended to limit the scope of the present invention. Other schemes for obtaining the interest expressions of the virtual objects within the virtual space hosted by the peer server 18-1 may be apparent to one of ordinary skill in the art upon reading this disclosure and are to be considered within the scope of the present invention.

While the process of obtaining the interest expressions of the virtual objects is illustrated as a single step, one of ordinary skill in the art will readily appreciate that the peer server 18-1 continually or periodically performs the process in order to accommodate changing interest expressions and mobile virtual objects entering and leaving the virtual space hosted by the peer server 18-1.

The peer server 18-1 then generates an advertisement/subscription (ad/sub) message (step 102). The ad/sub message is also referred to herein as a message flow path setup message. While the ad/sub message is discussed herein as a single message, the peer server 18-1 may alternatively generate and issue separate advertisement and subscription messages. Further, while the ad/sub message discussed herein is an aggregate ad/sub message for each of the virtual objects in the virtual space hosted by the peer server 18-1, the present invention is not limited thereto. The peer server 18-1 may alternatively issue separate advertisement and subscription messages or ad/sub messages for each virtual object in the virtual space hosted by the peer server 18-1 or for groups of virtual objects within the virtual space hosted by the peer server 18-1.

In one embodiment, the ad/sub message includes an advertisement record for each message type produced by one or more of the virtual objects within the virtual space hosted by the peer server 18-1. Each advertisement record includes the corresponding message type and an aggregate scope corresponding to an aggregate or combination of the auras of the one or more virtual objects within the virtual space hosted by the peer server 18-1 that produce messages of the corresponding message type. The aggregate scope may be expressed as, for example, a set of vectors each specifying a set of coordinates or a starting point, a direction, and a distance. The combination of the set of vectors using known geometric algorithms describes an area, which is the aggregate scope of the advertisement record. As another example, in a virtual world that is a fractal generated maze, the aggregate scope may be expressed based on a fractal equation. As another example, the aggregate scope may be represented by conditional logic or expressions such as, for example, "within 500 ft from point A OR within 750 ft from point B." Note that rather than including the aggregate aura, the scope may alternatively include information from which the aggregate aura can be extrapolated. For example, for visual messages from a virtual object such as a building, the scope of the corresponding advertisement record may including information describing, for example, a size of the building. The scope or aura of the visual messages may be extrapolated based on the size of the building.

In one embodiment, when aggregating the auras of the one or more virtual objects within the virtual space hosted by the peer server 18-1 that produce messages of a particular message type, the peer server 18-1 may optionally adjust the aggregate scope to compensate for various factors such as, for example, movement of mobile virtual objects. For example, for a message type produced by an avatar, the peer server 18-1 may adjust the aura of the avatar when aggregating the aura with the auras of other virtual objects producing that message type or adjust the aggregate scope for the message type to include a margin that compensates for frequent movement of the avatar. More specifically, the peer server 18-1 may adjust the aura of the avatar or the aggregate scope for the message type such that the aggregate scope is expanded by some margin. For instance, the aura or aggregate scope may be expanded in all directions or expanded in a predicted direction of movement for the avatar.

In addition, each advertisement record may include information or metadata describing the one or more virtual objects producing the corresponding message type and/or one or more references to information or metadata describing the virtual objects producing the corresponding message types.

In addition to describing the virtual objects themselves, the metadata may also include or describe the states of the virtual objects such as, for example, the locations of the virtual objects producing the corresponding message type.

The ad/sub message also includes a subscription record for each message type consumed by one or more of the virtual objects within the virtual space hosted by the peer server 18-1. Each subscription record includes the corresponding message type and an aggregate scope corresponding to an aggregate or combination of the AOIs of the one or more virtual objects within the virtual space hosted by the peer server 18-1 that consume messages of the corresponding message type. The aggregate scope may be expressed as, for example, a set of vectors each specifying a set of coordinates or a starting point, a direction, and a distance. The combination of the set of vectors using known geometric algorithms describes an area, which is the aggregate scope of the subscription record. As another example, in a virtual world that is a fractal generated maze, the aggregate scope may be expressed based on a fractal equation. As another example, the aggregate scope may be represented using a conditional expression.

In one embodiment, when aggregating the AOIs of the one or more virtual objects within the virtual space hosted by the peer server 18-1 that consume messages of a particular message type, the peer server 18-1 may optionally adjust the aggregate scope to compensate for various factors such as, for example, the movement of mobile virtual objects. For example, for a message type produced by an avatar, the peer server 18-1 may adjust the AOI of the avatar when aggregating the AOI with the AOIs of other virtual objects consuming that message type or adjust the aggregate scope for the message type to compensate for frequent movement of the avatar. More specifically, the peer server 18-1 may adjust the AOI of the avatar or the aggregate scope for the message type such that the aggregate scope is expanded.

In addition, each subscription record may include additional criteria for identifying virtual objects producing the corresponding message types that are of interest to the peer server 18-1 and/or the virtual objects within the virtual space hosted by the peer server 18-1 having an interest in the corresponding message type. For example, with respect to avatars producing messages of the corresponding message type, the criteria may include demographic or biological information describing the associated users or the like. Other criteria will be apparent to one of ordinary skill in the art upon reading this disclosure. Note that the criteria may vary depending on the details of the virtual world.

Note that the ad/sub message may also include an advertisement record for a new virtual object. The advertisement record may then trigger the other peer servers having an interest in the new virtual object to obtain content or other information and possibly an application needed to render the new virtual object from the peer server 18-1 or some other source. This may be particularly beneficial where users are enabled to customize their own virtual spaces. The ad/sub message may also include advertisement records for messages produced by the new virtual object and subscription records for messages consumed by the new virtual object.

While the discussion herein focuses on the embodiment where each of the advertisement and subscription records includes a scope, the present invention is not limited thereto. As an alternative, the ad/sub message may include a global scope applicable to all of the advertisement and subscription records. As another alternative, the ad/sub message may include a scope applicable to all of the advertisement records and a scope applicable to all of the subscription records.

When generating the ad/sub message, the peer server 18-1 may use conditional logic or expressions to represent or combine multiple records into a single rule. For example, rather than having a separate advertisement record for each message type produced, the peer server 18-1 may combine all advertisement records into a single conditional expression, or rule, or combine subsets of the records into corresponding conditional expressions, or rules.

Note that while the following discussion focuses on generating an ad/sub message including advertisement and subscription records for each virtual object within the virtual space hosted by the peer server 18-1, the present invention is not limited thereto. For example, the first ad/sub message generated and issued by the peer server 18-1 may be a complete ad/sub message including an advertisement record for each message type produced by any virtual object within the virtual space hosted by the peer server 18-1 and a subscription record for each message type consumed by any virtual object within the virtual space hosted by the peer server 18-1. However, subsequent ad/sub messages generated and issued by the peer server 18-1 may be complete ad/sub messages or, alternatively, may be partial ad/sub messages reflecting changes since the previous ad/sub message was generated and issued by the peer server 18-1.

In addition to the advertisement and subscription records, the ad/sub message may include unsubscribe messages enabling the peer server 18-1 to unsubscribe to message types that were previously of interest to the peer server 18-1. For example, the peer server 18-1 may desire to unsubscribe to a message type if the peer server 18-1 no longer has an interest in the message type.

Once the ad/sub message is generated, the peer server 18-1 sends the ad/sub message to one or more of its neighboring peer servers 18-2 through 18-7 (step 104). In one embodiment, the peer server 18-3 propagates the ad/sub message in an expanding ring search (ERS) manner, where a time-to-live (TTL) may be defined in order to enforce an absolute upper limit on the propagation of the ad/sub message.

More specifically, in one embodiment, the peer server 18-1 sends the ad/sub message to all of its neighboring peer servers 18-2 through 18-7. In another embodiment, the peer server 18-1 generates copies of the ad/sub message for each of the neighboring peer servers 18-2 through 18-7 and filters the copies of the ad/sub message based on the scopes of the advertisement and subscription messages. More specifically, for the neighboring peer server 18-2, advertisement records that have scopes that do not extend into the virtual space of the neighboring peer server 18-2 are filtered from the copy of the ad/sub message to be provided to the neighboring peer server 18-2. Note that the records that have already been processed with respect to the neighboring peer server 18-2 may also be filtered. Likewise, subscription messages whose scopes do not extend into the virtual space of the neighboring peer server 18-2 are filtered from the copy of the ad/sub message to be provided to the neighboring peer server 18-2. If the filtered copy of the ad/sub message to be provided to the neighboring peer server 18-2 is empty, then no ad/sub message is provided to the neighboring peer server 18-2. Otherwise, the filtered copy of the ad/sub message is provided to the neighboring peer server 18-2. Likewise, the copies of the ad/sub message for the other neighboring peer servers 18-3 through 18-7 are filtered and provided to the other neighboring peer servers 18-3 through 18-7.

As discussed below, the neighboring peer servers 18-2 through 18-7 then process the ad/sub message, propagate the ad/sub message if appropriate, and respond to the ad/sub message. Thus, the peer server 18-1 receives responses to the ad/sub message from one or more of the neighboring peer servers 18-2 through 18-7 (step 106). The responses from the neighboring peer servers 18-2 through 18-7 identify message types of interest or, more specifically, identify message types from the advertisement records in the ad/sub message that are to be routed to them. Using the peer server 18-2 as an example, the response from the peer server 18-2 identifies message types from the advertisement records in the ad/sub message that are of interest to the peer server 18-2. The message types are of interest to the peer server 18-2 if they are consumed by virtual objects in the virtual space hosted by the peer server 18-2 or of interest to one or more neighboring peer servers of the peer server 18-2 to which the peer server 18-2 propagated the ad/sub message. If none of the message types from the advertisement records in the ad/sub message are of interest to the peer server 18-2, the peer server 18-2 may provide a response indicating that none of the message types from the advertisement records are of interest or, alternatively, may not respond to the ad/sub message. Likewise, the other neighboring peers 18-3 through 18-7 provide responses to the ad/sub message.

Based on the responses to the ad/sub message from the neighboring peer servers 18-2 through 18-7, the peer server 18-1 then updates its routing table such that messages produced by the virtual objects in the virtual space hosted by the peer server 18-1 are routed only to the ones of the neighboring peer servers 18-2 through 18-7 expressing an interest in that message type (step 108). In one embodiment, for each message type from the advertisement records in the ad/sub message, the routing table includes an entry in the form of:

<message type><message recipient(s)><virtual object ID(s)> where the virtual object IDs are IDs of the virtual objects in the virtual space hosted by the peer server 18-1 that are producers of the message type. Alternatively, the routing table may be maintained such that any message originating in the virtual space hosted by the peer server 18-1 of the corresponding message type is to be routed according to this entry. The message recipients are one or more of the neighboring peer servers 18-2 through 18-7 that have expressed an interest in the message type. Thereafter, when a virtual object produces a message, the peer server 18-1 routes the message according to the routing table such that the message is routed only to ones of the neighboring peer servers 18-2 through 18-7 that have expressed an interest in that message type.

As discussed below in detail, with respect to the subscription records in the ad/sub message, message flow paths from others of the peer servers 18-2 through 18-N hosting virtual objects producing message types identified in the subscription records are identified as the ad/sub message is propagated among the peer servers 18-2 through 18-N.

Figure 5:
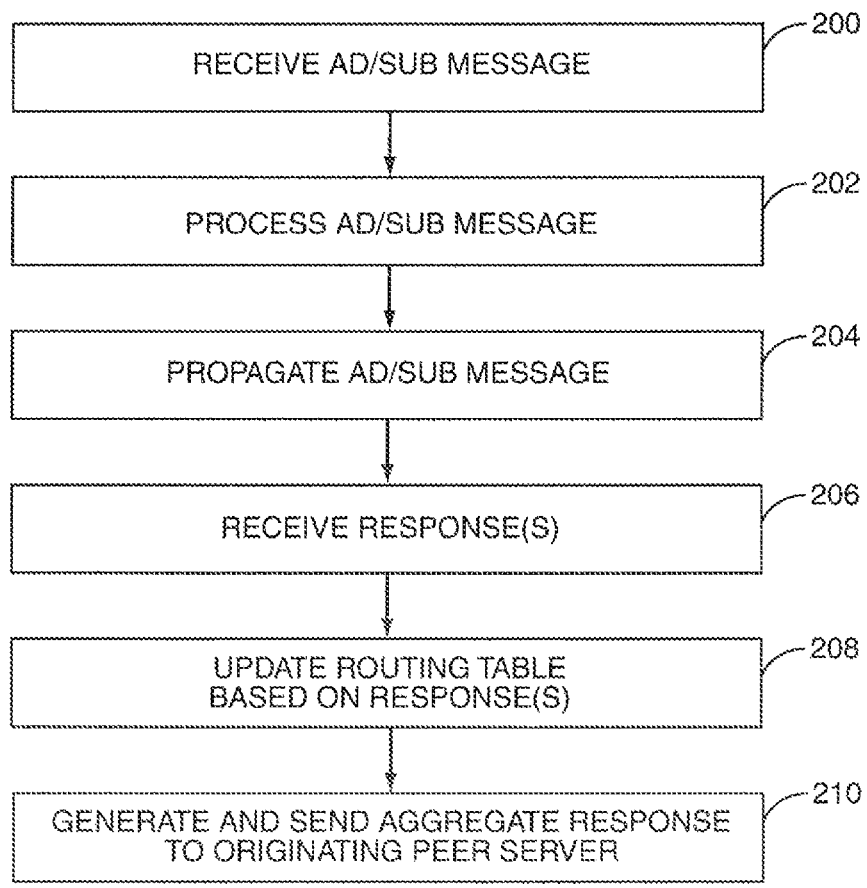
FIG. 5 illustrates the operation of a neighboring peer server in response to receiving the ad/sub message from an originating peer server according to one embodiment of the present invention.

FIG. 5 illustrates the operation of a peer server, such as the peer server 18-3, receiving the ad/sub message from the peer server 18-1 according to one embodiment of the present invention. The peer server 18-1 is also referred to herein as the originating peer server 18-1. First, the peer server 18-3 receives the ad/sub message from the originating peer server 18-1 (step 200). The peer server 18-3 then processes the ad/sub message to determine whether to subscribe to any of the message types identified by the advertisement records in the ad/sub message and, based on the subscription records, whether any message types produced by virtual objects in the virtual space hosted by the peer server 18-3 are to be routed to the originating peer server 18-1 (step 202).

More specifically, for each advertisement record, the peer server 18-3 determines whether any of the virtual objects in the virtual space hosted by the peer server 18-3 are consumers of the corresponding message type. If so, the peer server 18-3 determines whether any of the virtual objects that are consumers of the message type are within the aggregate scope, or aggregate aura, for the advertisement record or, alternatively, whether any portion of the virtual space hosted by the peer server 18-3 is within the aggregate scope, or aggregate aura, for the advertisement record. If so, the peer server 18-3 adds an entry to a response to the ad/sub message to be thereafter provided to the originating peer server 18-1 subscribing to messages of the message type from the originating peer server 18-1. As a result, the response to the ad/sub message includes entries subscribing to each of the message types identified by the advertisement records of the ad/sub message that are consumed by one or more of the virtual objects in the virtual space hosted by the peer server 18-3.

In addition, for each subscription record, the peer server 18-3 determines whether messages of the corresponding message type are produced by one or more virtual objects within the virtual space hosted by the peer server 18-3. If so, the peer server 18-3 determines whether any of the virtual objects producing the corresponding message type are within the aggregate scope, or aggregate AOI, for the subscription record or, alternatively, if any portion of the virtual space hosted by the peer server 18-3 is within the aggregate scope, or aggregate AOI, for the subscription record. If so, the peer server 18-3 updates its routing table such that messages of the corresponding message type produced by virtual objects within the aggregate scope for the subscription record are routed to the originating peer server 18-1.

In addition, the peer server 18-3 propagates the ad/sub message, or a filtered copy thereof, to one or more of its neighboring peer servers 18-2, 18-4, and 18-8 through 18-10 (step 204). In one embodiment, there is a pre-established default routing scheme for the ad/sub message. Assuming an efficient routing scheme, the peer server 18-3 may propagate the ad/sub message, or a filtered copy thereof, only to the ones of its neighboring peer servers 18-2, 18-4, and 18-8 through 18-10 that have not or will not receive the ad/sub message from another peer server according to the default routing scheme. However, the present invention is not limited thereto. Any routing scheme may be used. Further, the propagation does not have to be efficient. In other words, duplicate ad/sub messages may be permitted and simply ignored. Also note that the ad/sub message may be used to establish the default routing scheme, or propagation path, for subsequent ad/sub messages. Note that while peer servers 18-2 and 18-4 are also neighbors of the peer server 18-3, the ad/sub message need not be propagated to them because they are also neighbors of the originating peer server 18-1 and have therefore already received the ad/sub message from the originating peer server 18-1.

More specifically, in one embodiment, the peer server 18-3 creates a copy of the ad/sub message for each of the neighboring peer servers 18-8 through 18-10 and optionally filters the copies of the ad/sub messages based on the scopes of the advertisement and subscription records. Using the peer server 18-8 as an example, the peer server 18-3 may filter the copy of the ad/sub message for the peer server 18-8 to remove advertisement and subscription records whose aggregate scopes do not extend into the virtual space hosted by the peer server 18-8. Likewise, the copies of the ad/sub message for the other neighboring peer servers 18-9 and 18-10 are filtered. The filtered copies of the ad/sub message are then provided to neighboring peer servers 18-8 through 18-10.

With respect to the subscription records, when propagating the copies of the ad/sub message to the neighboring peer servers 18-8 through 18-10, the peer server 18-3 updates its routing table such that messages from its neighboring peer servers of the message types identified by the subscription records are routed to the originating peer server 18-1. More specifically, using the peer server 18-8 as an example, the peer server 18-3 updates its routing table such that messages of the message types identified in the subscription records in the copy of the ad/sub message provided to the peer server 18-8 that are thereafter received from the peer server 18-8 are routed to the originating peer server 18-1. As discussed below, the neighboring peer server 18-8 updates its routing table in response to the ad/sub message such that messages originating from virtual objects in its virtual space or received from its neighboring peer servers that are of the message types identified in the subscription records are routed to the peer server 18-3, which in turn routes the messages to the originating peer server 18-1.

The peer server 18-3 then receives responses to the ad/sub message from the neighboring peer servers 18-8 through 18-10 (step 206). The responses identify ones of the message types from the advertisement records of the ad/sub message, or filtered copy thereof, that are of interest to the neighboring peer servers 18-8 through 18-10. Message types are of interest to the neighboring peer servers 18-8 through 18-10 if the neighboring peer servers 18-8 through 18-10 host virtual objects within their virtual spaces that consume the message types or if the neighboring peer servers of the peer servers 18-8 though 18-10 express an interest in the message types in response to propagation of the ad/sub message from the peer servers 18-8 through 18-10 to those neighboring peer servers. Using the peer server 18-8 as an example, the response from the peer server 18-8 includes a number of entries, records, or information otherwise identifying message types from advertisement records of the copy of the ad/sub message provided to the peer server 18-8 that are of interest to the peer server 18-8.

After receiving the responses, the peer server 18-3 updates its routing table such that messages from the originating peer server 18-1 are routed to ones of the neighboring peer servers 18-8 through 18-10 that have expressed an interest in those message types (step 208). In one embodiment, the peer server 18-3 generates an entry in its routing table for each message type from the originating peer server 18-1 in the form of:

<preceding peer server><message type><message origin><succeeding peer(s)> where, in this example, the preceding peer is the originating peer server 18-1 and the one or more succeeding peers are the ones of the neighboring peer servers 18-8 through 18-10 that have expressed an interest in that message type in response to the ad/sub message. The message origin may be information identifying one or more originating peer servers, which in some scenarios may be different than the preceding peer server, to which this routing table entry applies. Note that the entries in the routing table may include additional information.

In addition, the peer server 18-3 generates and sends an aggregate response to the originating peer server 18-1 (step 210). The aggregate response is the aggregate or combination of the responses from the neighboring peer servers 18-8 through 18-10 and the response of the peer server 18-3 generated in step 202. As such, the aggregate response identifies the message types from the advertisement records in the ad/sub message received from the originating peer server 18-1 in which the peer server 18-3 has an interest. Again, the peer server 18-3 has an expressed interest in message types consumed by virtual objects in the virtual space hosted by the peer server 18-3 as well as message types of interest to the neighboring peer servers 18-8 through 18-10. As discussed above, upon receiving the aggregate response to the ad/sub message, the originating peer server 18-1 updates its routing table such that messages of the message types in which the peer server 18-3 has expressed an interest are routed to the peer server 18-3.

In a similar fashion, the other neighboring peer servers 18-2 and 18-4 through 18-7 of the originating peer server 18-1 process, propagate, and respond to the ad/sub message from the originating peer server 18-1. As a result, message flow paths for the message types produced by the virtual objects in the virtual space hosted by the originating peer server 18-1 are defined. In addition, as a result of the subscription records in the ad/sub message, message flow paths for message types produced by virtual objects in the virtual spaces hosted by the other peer servers 18-2 through 18-N that are of interest to one or more of the virtual objects in the virtual space hosted by the originating peer server 18-1 are defined from the corresponding ones of the peer servers 18-2 through 18-N to the originating peer server 18-1. Likewise, the other peer servers 18-2 through 18-N issue their own ad/sub messages in order to define message flow paths for message types produced and consumed by the virtual objects within their virtual spaces.

Figure 6A:
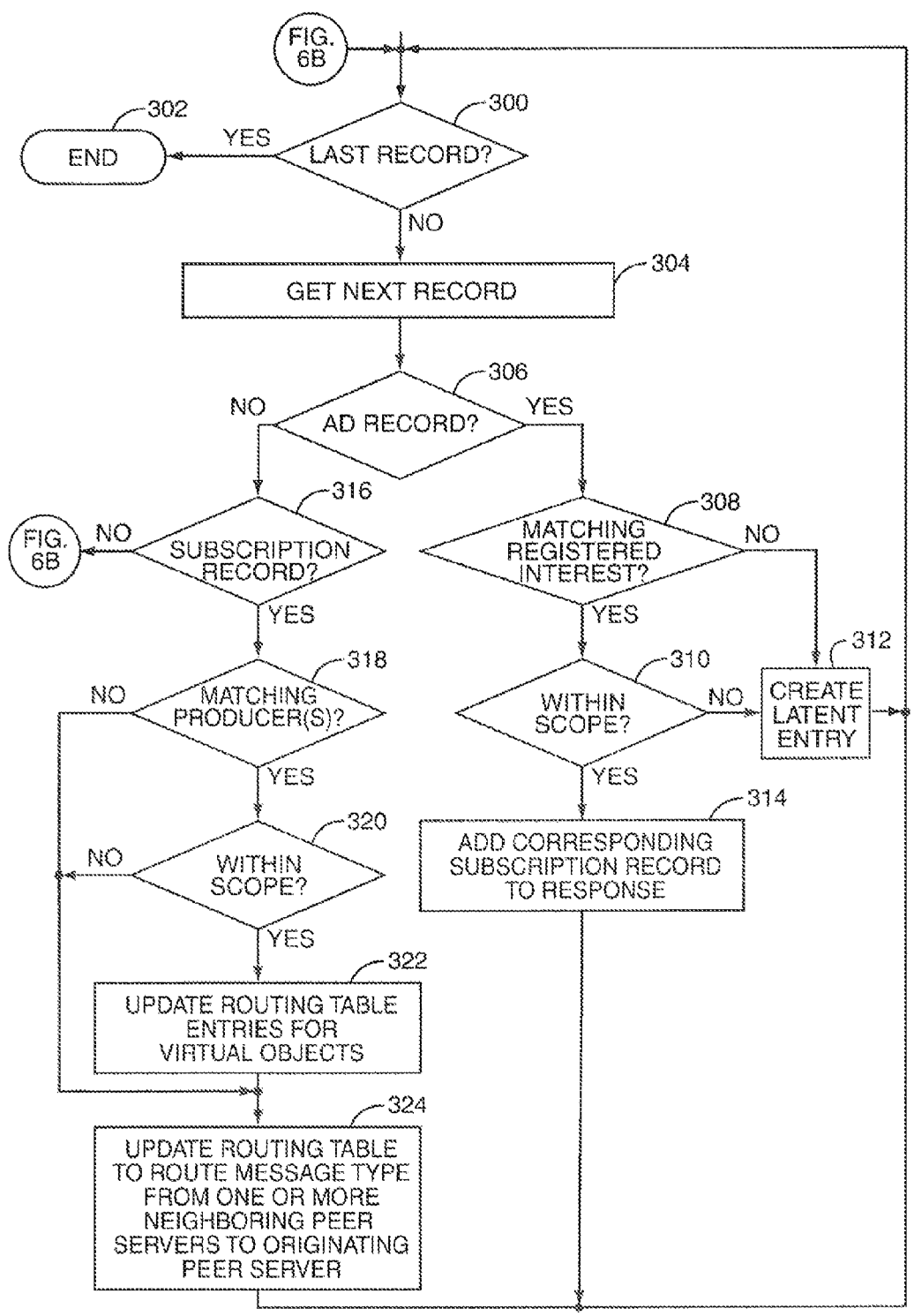
FIGS. 6A and 6B are a more detailed illustration of the operation of the neighboring peer server to process the ad/sub message according to one embodiment of the present invention.
Figure 6B:
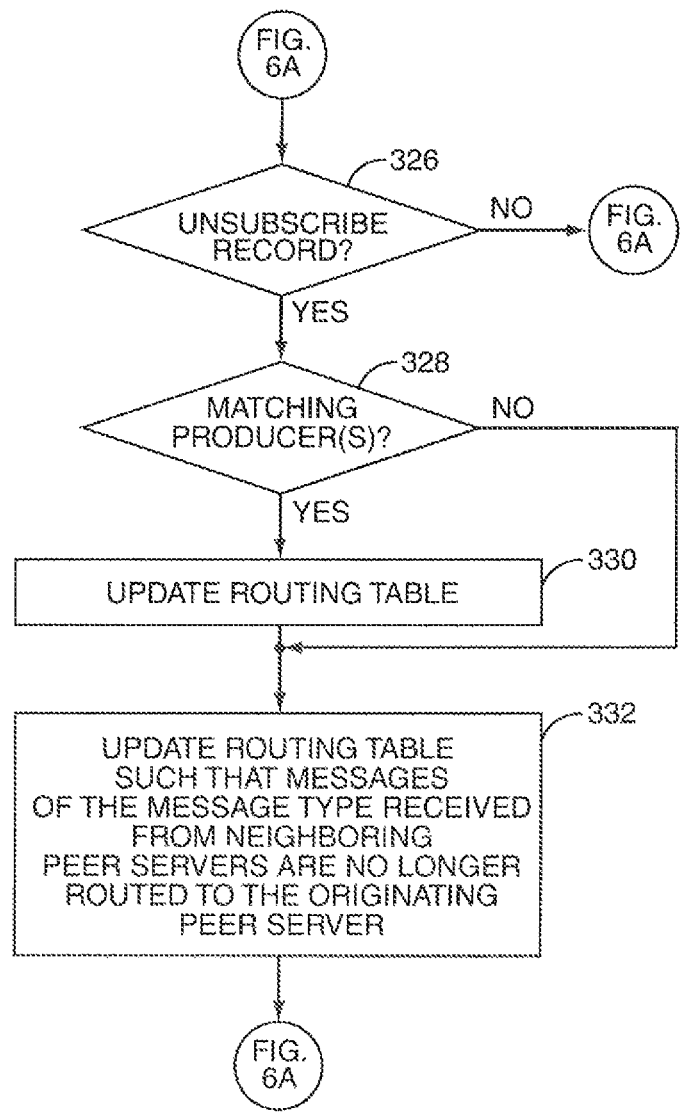

FIGS. 6A and 6B are a more detailed illustration of the processing step 202 of FIG. 5 according to one embodiment of the present invention. More specifically, in order to process the ad/sub message from the originating peer server 18-1, the peer server 18-3 first determines whether it has reached the last record in the ad/sub message (step 300). Note that step 300 is preferably not performed the first iteration through the processing loop since the ad/sub message includes at least one record. If the peer server 18-3 has reached the last record in the ad/sub message, the process ends (step 302). If the last record in the ad/sub message has not been reached, the peer server 18-3 then gets the next record, which for the first iteration will be the first record, in the ad/sub message (step 304).

The peer server 18-3 then determines whether the record is an advertisement record (step 306). If so, the peer server 18-3 determines whether any of the virtual objects in the virtual space hosted by the peer server 18-3 have registered an interest for the message type identified by the advertisement record (step 308). More specifically, in one embodiment, the peer server 18-3 may determine whether any of the virtual objects in its virtual space are consumers of the message type based on the interest expressions of the virtual objects that have been registered with the peer server 18-3. If one or more of the virtual objects in the virtual space hosted by the peer server 18-3 is a consumer of the message type, the peer server 18-3 then determines whether the virtual objects that are consumers of the message type are within the aggregate scope or, optionally, expected to be within the aggregate scope for the advertisement record (step 310).

If none of the virtual objects in the virtual space hosted by the peer server 18-3 have an interest in the message type or if none of the virtual objects in the virtual space having an interest in the message type are within or expected to be within the aggregate scope for the advertisement record, the peer server 18-3 may optionally create a latent entry or latent advertisement record (step 312). The latent entry generally corresponds to the advertisement record and is stored such that the peer server 18-3 may subscribe to the message type of the advertisement record in the future if one or more virtual objects in its virtual space have a registered interest in the message type and are within or expected to be within the aggregate scope of the advertisement record. If one or more of the virtual objects in the virtual space have a registered interest in the message type and are within or expected to be within the aggregate scope of the advertisement record, the peer server 18-3 adds a corresponding subscription record to the response to the ad/sub message to be provided to the originating peer server 18-1 (step 314).

Returning to step 306, if the record is not an advertisement record, the peer server 18-3 determines whether the record is a subscription record (step 316). If so, the peer server 18-3 determines whether any of the virtual objects in the virtual space hosted by the peer server 18-3 are producers of the corresponding message type (step 318). If so, the peer server 18-3 determines whether any of the virtual objects that produce the message type are within the aggregate scope, or aggregate AOI, of the subscription record (step 320). If so, the peer server 18-3 updates its routing table such that messages of the message type produced by the virtual objects in its virtual space and within the aggregate scope of the subscription record are routed to the originating peer server 18-1 (step 322).

Then, whether or not any of the virtual objects in the virtual space of the peer server 18-3 are interested in the message type and, if so, are within the aggregate scope of the subscription record, the process proceeds to step 324. In step 324, the peer server 18-3 updates its routing table such that messages of the message type identified by the subscription record received from one or more of its neighboring peer servers 18-8 through 18-10 to which the peer server 18-3 propagates the ad/sub message are thereafter routed to the originating peer server 18-1 (step 324). Thus, whether or not any virtual objects in the virtual space hosted by the peer server 18-3 are consumers of the message type, the peer server 18-3 still updates its routing table if it propagates the ad/sub message to one or more of its neighboring peer servers 18-8 through 18-10 such that messages received from those neighboring peer servers of that message type are routed to the originating peer server 18-1. At this point, the process returns to step 300 and is repeated for the next record in the ad/sub message.

Returning to step 316, if the record is not a subscription record, the peer server 18-3 determines whether the record is an unsubscribe record (FIG. 6B, step 326). In general, an unsubscribe record may be issued by the originating peer server 18-1 when the originating peer server 18-1 no longer has an interest in the corresponding message type. For example, the originating peer server 18-1 may issue an unsubscribe record when an avatar that is a consumer of a message type leaves the virtual space of the originating peer server 18-1 and the originating peer server 18-1 has no other virtual objects consuming the message type and the originating peer server 18-1 does not have an interest in the message type for purposes of routing. If the record is not an unsubscribe record, the process returns to step 300. If the record is an unsubscribe record, the peer server 18-3 determines whether any of the virtual objects in its virtual space are producers of the corresponding message type (step 328). If so, the peer server 18-3 updates its routing table such that messages of the corresponding message type produced by virtual objects within its virtual space are no longer routed to the originating peer server 18-1 (step 330). In addition, whether or not virtual objects producing the corresponding message type are within the virtual space of the peer server 18-3, the peer server 18-3 updates its routing table such that messages of the corresponding message type received from its neighboring peer servers 18-8 through 18-10 are no longer routed to the originating peer server 18-1 (step 332). The process then returns to step 300 of FIG. 6A and is repeated for the next record in the ad/sub message.

Figure 7:
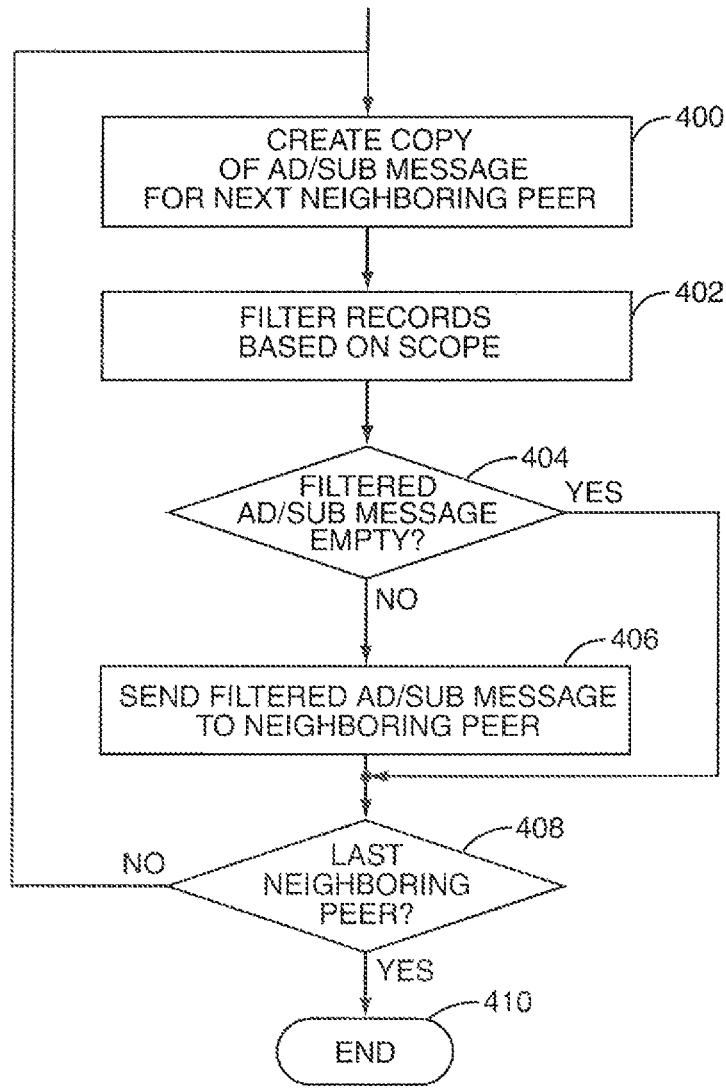
FIG. 7 is a more detailed illustration of the operation of the neighboring peer server to propagate the ad/sub message according to one embodiment of the present invention.

FIG. 7 is a more detailed illustration of the propagation step 204 of FIG. 5 according to one embodiment of the present invention. First, the peer server 18-3 generates a copy of the ad/sub message from the originating peer server 18-1 for one of its neighboring peer servers 18-8 through 18-10 (step 400). Note that it may not be necessary to create a copy of the ad/sub message if no modifications are necessary before propagation. In this example, the originating peer server 18-3 first generates a copy of the ad/sub message for the peer server 18-8. Copies of the ad/sub message for the other neighboring peer servers 18-9 and 18-10 are generated and processed in subsequent iterations of the loop.

The peer server 18-3 then filters the advertisement and subscription records in the copy of the ad/sub message based on the aggregate scope of each of the records (step 402). More specifically, advertisement records having an aggregate scope, or aggregate aura, that does not extend into the virtual space hosted by the peer server 18-8 are removed from the copy of the ad/sub message to be provided to the peer server 18-8. Likewise, subscription records having an aggregate scope, or aggregate AOI, that does not extend into the virtual space hosted by the peer server 18-8 are also removed from the copy of the ad/sub message to be provided to the peer server 18-8.

After filtering, the peer server 18-3 determines whether the filtered copy of the ad/sub message is empty (step 404). If not, the peer server 18-3 sends the filtered copy of the ad/sub message to the peer server 18-8 (step 406). Note that, at this point, the peer server 18-3 may update its routing table such that messages of the message types identified by the subscription records in the filtered copy of the ad/sub message that are thereafter received from the peer server 18-8 are routed to the originating peer server 18-1. Then, whether or not the filtered copy of the ad/sub message is empty, the peer server 18-3 determines whether the peer server 18-8 is the last neighboring peer server (step 408). If so, the process ends (step 410). If not, the process returns to step 400 and is repeated for the remaining neighboring peer servers 18-9 and 18-10.

FIGS. 8A through 8D illustrate the advertisement and subscription process according to one embodiment of the present invention. For clarity and ease of discussion, FIGS. 8A through 8D illustrate the process with respect to the cells, or virtual spaces, of the virtual world. However, as will be appreciated by one of ordinary skill in the art, the actual message flow is between the peer servers 18-1 through 18-18 and the clients 20-X, 20-Y, and 20-Z associated with the illustrated avatars.

Figure 8A:
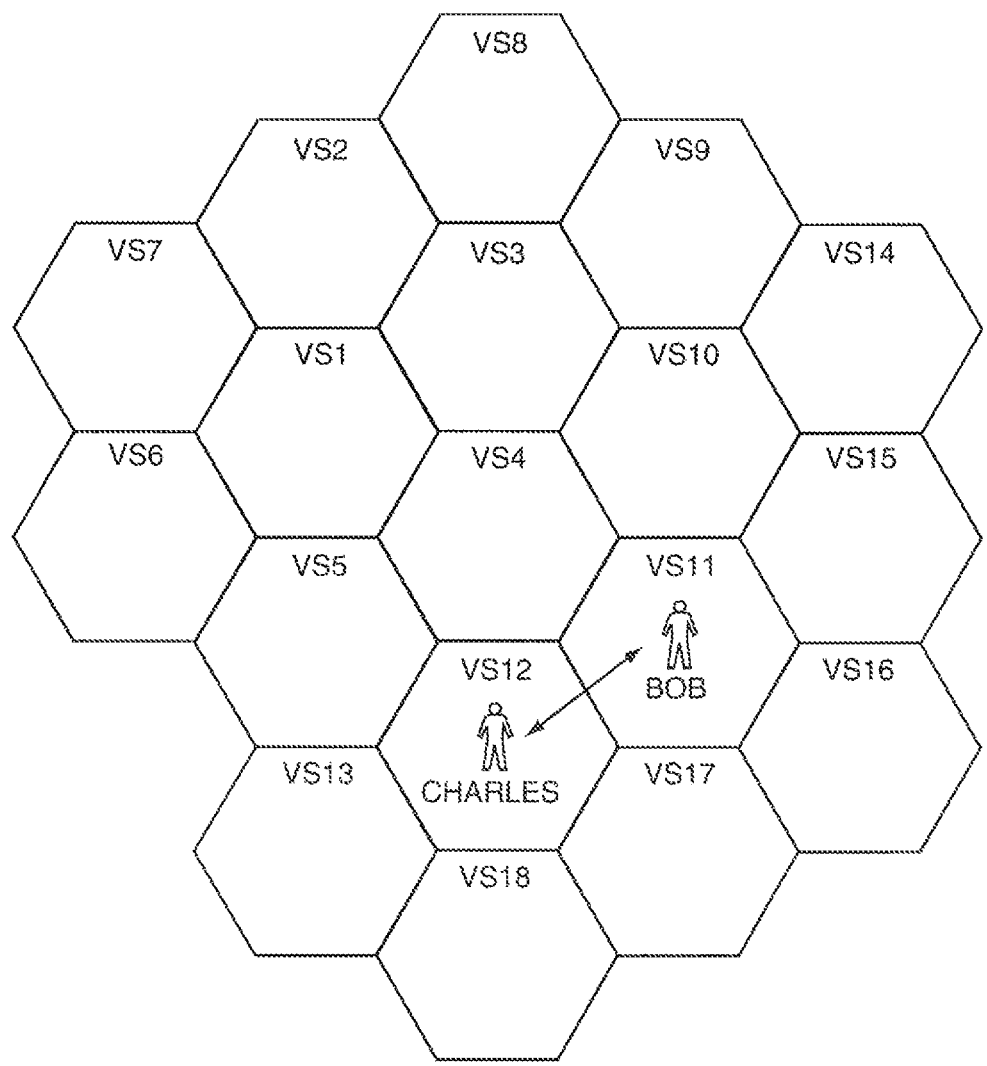

FIG. 8A illustrates an initial state where an avatar of a user Bob is within virtual space VS11, which is hosted by peer server 18-11 (FIG. 3). Likewise, an avatar of a user Charles is within virtual space VS12, which is hosted by peer server 18-12 (FIG. 3). The peer servers 18-11 and 18-12 have already established the message flow path for messages consumed and produced by the avatars of Bob and Charles.

Figure 8B:
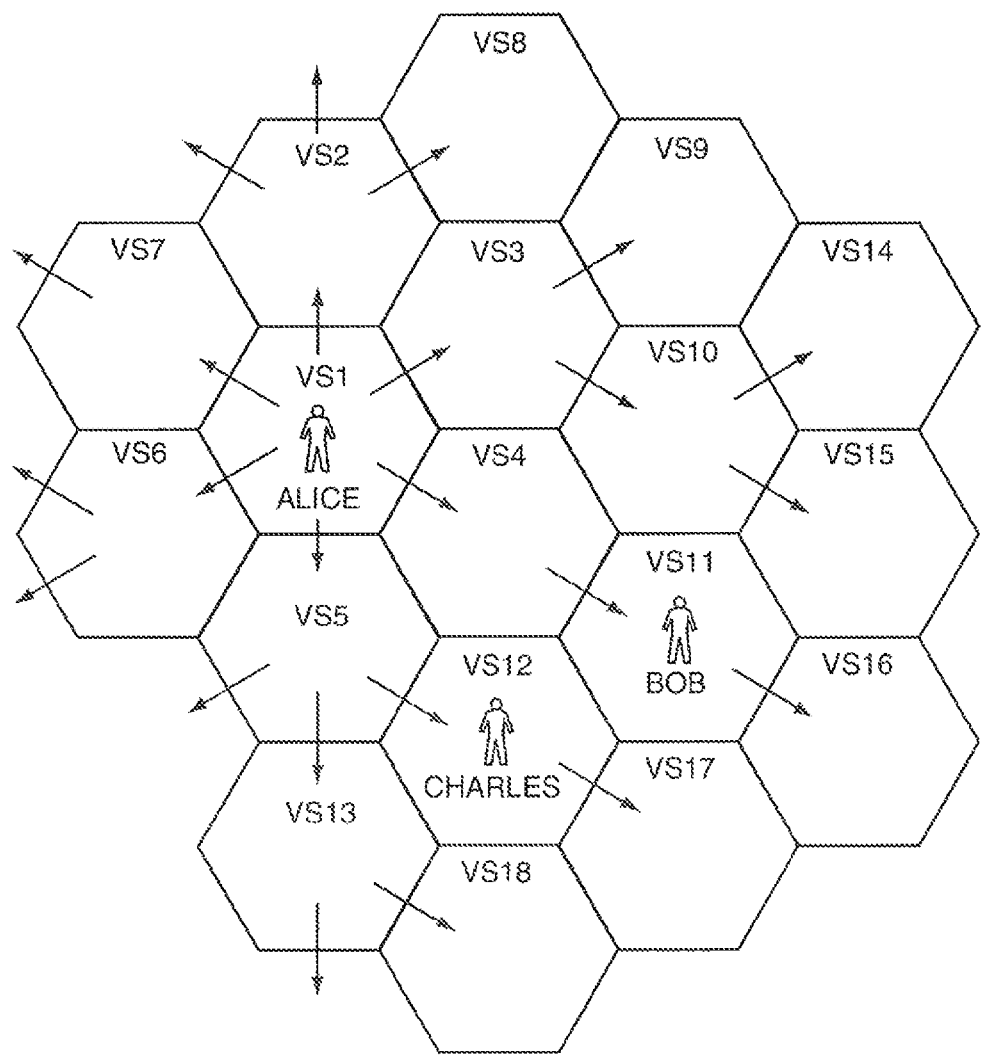

FIG. 8B illustrates the virtual world at a subsequent point in time where an avatar of a user Alice is within virtual space VS1, which is hosted by the peer server 18-1 (FIG. 3). As, a result, the peer server 18-1 hosting the virtual space VS1, which is hereafter referred to as the originating peer server 18-1, issues an ad/sub message to its neighboring peer servers 18-2 through 18-7 in the manner discussed above. The ad/sub message includes an advertisement record for each message type produced by the avatar of Alice and a subscription record for each message type consumed by the avatar of Alice. The ad/sub message is then propagated among the peer servers 18-2 through 18-N based on the aggregate scope of each of the advertisement and subscription records in the ad/sub message.

As illustrated, the ad/sub message is propagated to the peer server 18-4 hosting the virtual space VS4, which in turn propagates the ad/sub message, or a filtered copy thereof, to the peer server 18-11 hosting the virtual space VS11. Similarly, the ad/sub message is propagated to the peer server 18-5 hosting the virtual space VS5, which in turn propagates the ad/sub message, or a filtered copy thereof, to the peer server 18-12 hosting the virtual space VS12.

Figure 8C:
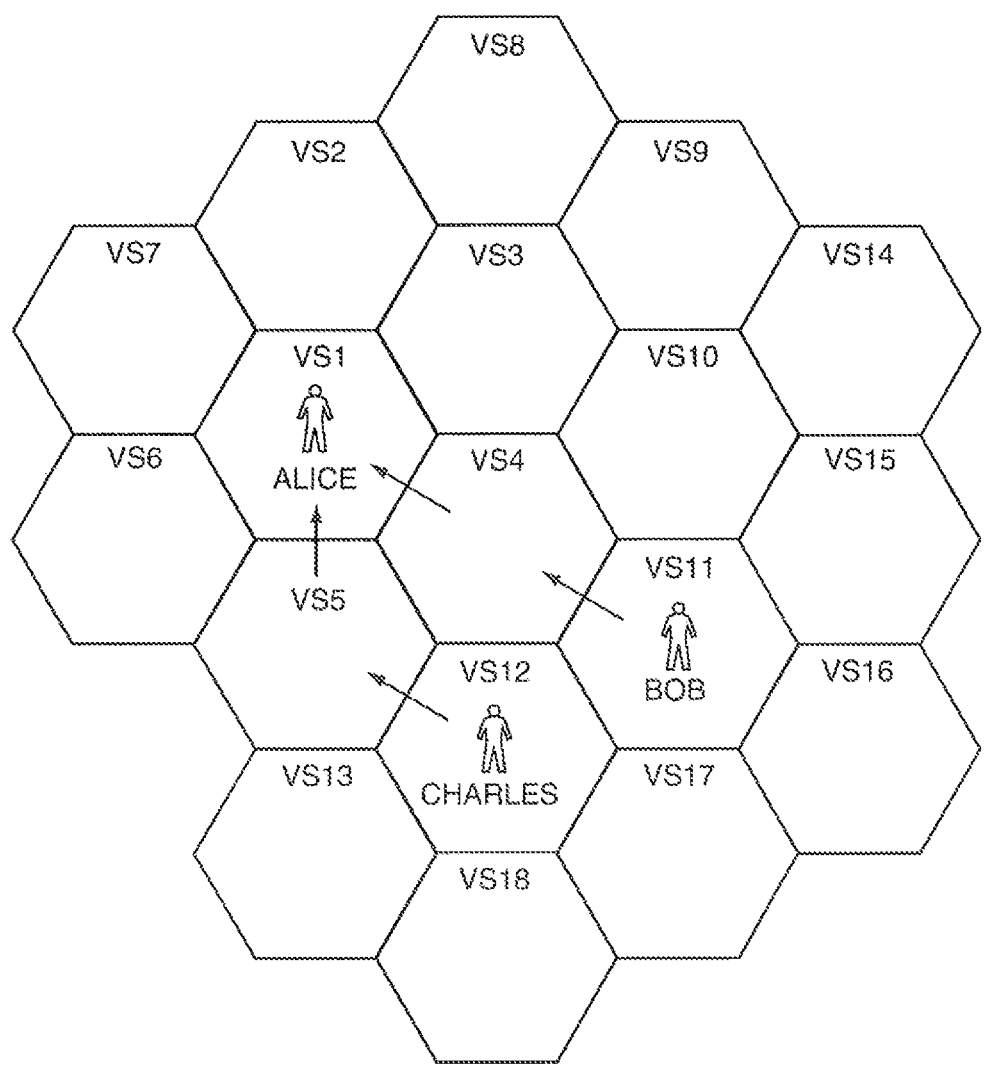

FIG. 8C illustrates the responses to the ad/sub message according to one embodiment of the present invention. In this example, ones of the peer servers 18-2 through 18-N in receipt of the ad/sub message and not having an interest in one or more of the message types identified by the advertisement records do not respond. However, the present invention is not limited thereto. As illustrated, because the avatar of the user Bob is a consumer of all or at least some of the message types produced by the avatar of the user Alice identified in the advertisement records in the ad/sub message, the peer server 18-11 hosting the virtual space VS11 sends a response to the peer server 18-4 hosting the virtual space VS4 expressing an interest in one or more of the message types identified by the advertisement records that are consumed by the avatar of the user Bob. As a result, the peer server 18-4 hosting the virtual space VS4 updates its routing table and sends a response to the peer server 18-1 expressing an interest in the message types identified in the response from the peer server 18-11. In response, the originating peer server 18-1 updates its routing table such that messages of the message types in which the peer server 18-4 has expressed an interest are thereafter routed to the peer server 18-4, which in turn routes those messages to the peer server 18-11.

Likewise, because the avatar of the user Charles is a consumer of all or at least some of the message types produced by the avatar of the user Alice identified in the advertisement records in the ad/sub message, the peer server 18-12 hosting the virtual space VS12 sends a response to the peer server 18-5 hosting the virtual space VS5 expressing an interest in one or more of the message types identified by the advertisement records that are consumed by the avatar of the user Charles. As a result, the peer server 18-5 hosting the virtual space VS5 updates its routing table and sends a response expressing an interest in the message types identified in the response from the peer server 18-12. In response, the originating peer server 18-1 updates its routing table such that messages of message types in which the peer server 18-5 has expressed an interest are thereafter routed to the peer server 18-5, which in turn routes those messages to the peer server 18-12.

With respect to the message types consumed by the avatar of the user Alice, the peer server 18-4 hosting the virtual space VS4 updates its routing table in response to the ad/sub message such that messages of the message types identified by the subscription records in the ad/sub message subsequently received from its neighboring peer servers such as the peer server 18-11 are routed to the originating peer server 18-1. The peer server 18-11 updates its routing table in response to the ad/sub message such that messages produced by the avatar of the user Bob of the message types identified by the subscription records are routed to the peer server 18-4 hosting the virtual space VS4, which will then route those messages to the peer server 18-1. In a similar fashion, the peer servers 18-5 and 18-12 establish a message flow path for the message types produced by the avatar of the user Charles that are consumed by the avatar of the user Alice from the peer server 18-12 to the peer server 18-1 via the peer server 18-5.

Figure 8D:
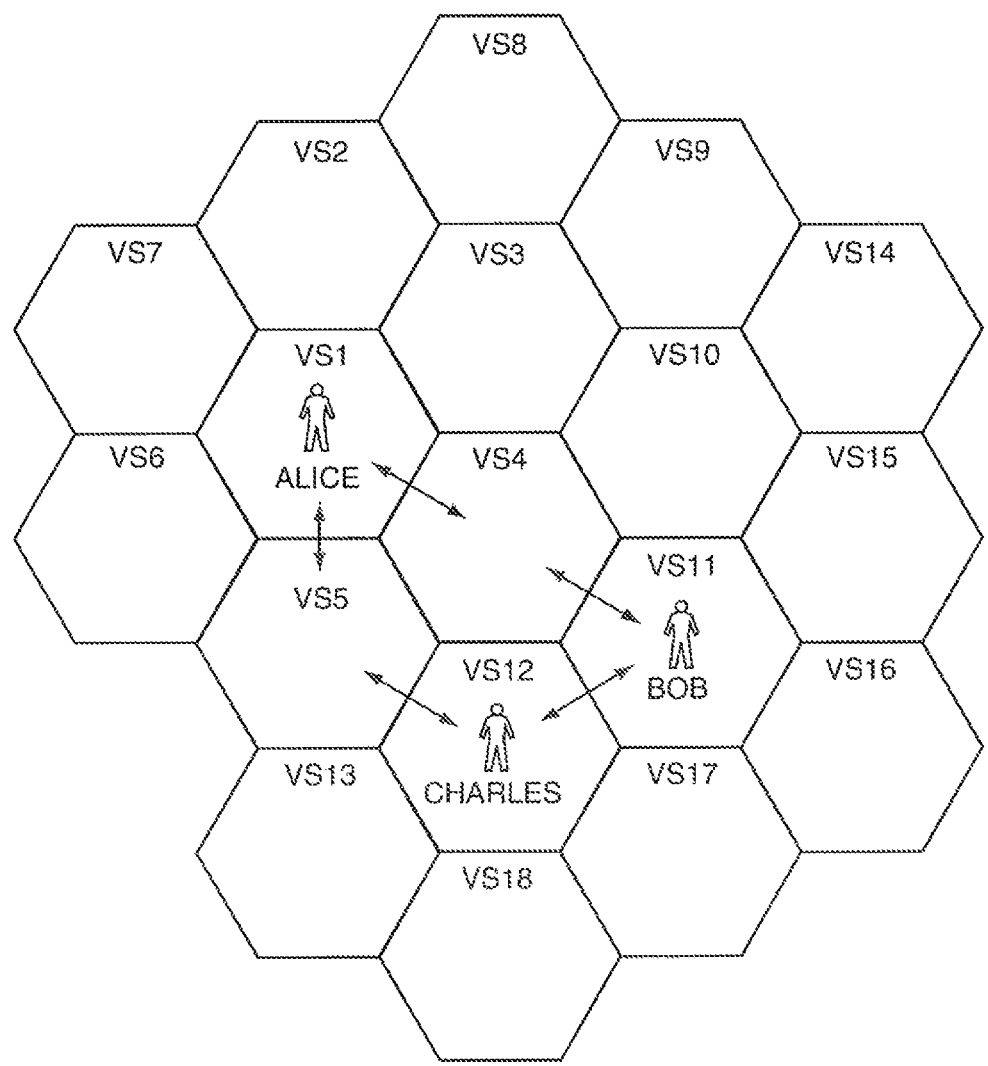

FIG. 8D illustrates the resultant message flow paths for the propagation of messages consumed and produced by the avatars of the users Alice, Bob, and Charles. Messages produced by the avatar of the user Alice are provided from the associated client to the peer server 18-1 hosting the virtual space VS1. The peer server 18-1 then routes the messages to the peer servers 18-4 and 18-5 based on its routing table, and the peer servers 18-4 and 18-5 then route the messages to the peer servers 18-11 and 18-12, respectively, based on their routing tables. The peer server 18-11 then routes the messages to the client associated with the avatar of the user Bob. Likewise, the peer server 18-12 routes the messages of interest to the client associated with the avatar of the user Charles.

In a similar fashion, messages produced by the avatar of the user Bob that are of message types consumed by the avatar of the user Alice are routed from the peer server 18-11 to the peer server 18-1 via the peer server 18-4. The peer server 18-1 then routes the messages to the client associated with the avatar of the user Alice. Likewise, messages produced by the avatar of the user Charles that are of message types consumed the avatar of the user Alice are routed from the peer server 18-12 to the peer server 18-1 via the peer server 18-5. The peer server 18-1 then routes the messages to the client associated with the avatar of the user Alice.

Note that either in response to an advertisement record for the avatar of the user Alice, in response to receiving advertisement records for message types produced by the avatar of the user Alice, or in response to receiving, for example, visual messages from the avatar of the user Alice, the clients associated with the avatars of the users Bob and Charles may obtain content or information and optionally an application needed to render the avatar of the user Alice.

Another feature that may be provided by the present invention is predictive ad/sub messages. More specifically, referring to FIG. 8D, if Bob controls his avatar such that it begins to move toward the virtual space VS10, the peer server 18-11 may calculate an estimated time of arrival in the virtual space VS10 and issue a predictive ad/sub message specifically addressed to the peer server 18-10 enabling the peer server 18-10 to subscribe to message types consumed by Bob's avatar and/or message types produced by Bob's avatar in anticipation for the arrival of Bob's avatar in the virtual space VS10.

As a more complex example, Alice's avatar may use binoculars to explore distant parts of the virtual world. As such, the peer server 18-1 would need to determine the focal point of the binoculars, discover the peer server hosting the corresponding virtual space, and subscribe to visual message types and event messages from that virtual space. The focal point of the binoculars now defines the AOI for Alice's avatar with respect to those message types. Assume that Alice is looking southeast and the focal point of the binoculars is in the virtual space VS16. This may lie outside of the normal AOI. Thus, in one embodiment, the peer server 18-1 may issue, for example, a vector addressed subscription message in the direction of the peer server 18-16. The subscription message may be vector addressed by, for example, defining the scope(s) of the subscription record(s) as the focal point of the binoculars. As such, the peer servers 18-4 and 18-11 simply update their routing tables and forward the subscription message on to the peer server 18-16. When the peer server 18-16 receives the subscription message, it updates its routing table and routes the desired message types back to the peer server 18-1. Alternatively, the peer server 18-16 may establish a direct connection to the peer server 18-1.

Now, if Alice turns in the clockwise direction still looking through the binoculars, the peer server 18-1 may predict that the focal point will soon be looking at the virtual space hosted by the peer server southeast of the virtual space hosted by the peer server 18-16. As such, the peer server 18-1 may issue a predictive vector addressed subscription message to the peer server 18-17. The predictive vector addressed subscription message may be for all concerned message types or only for content message types since content message types typically take the most time to transfer. In an alternative embodiment, the peer server 18-1 may instruct the peer server 18-16 to issue the predictive vector addressed subscription message to the peer server 18-17.

Another feature that may be provided is specifically addressed ad/sub messages. While this is discussed above with respect to the binoculars example, there are other scenarios where specifically addressed ad/sub messages may be desirable. For example, if two users are interacting via a social communication session such as a teleconference, instant messaging or chat session, or the like, a corresponding ad/sub message may be specifically addressed from the peer server hosting the client of one of the users to the peer server hosting the client of the other user.

FIG. 9 illustrates a block diagram of an exemplary embodiment of the peer server 18-1. However, the following discussion is equally applicable to the other peer servers 18-2 through 18-N. Note that in FIG. 9 dashed lines are used to indicate the flow of messages whereas solid lines are used to indicate the flow of data. The peer server 18-1 generally includes a virtual world engine 24, an interest manager 26, and a peer message handler 28, each of which may be implemented in software, hardware, or a combination thereof. The virtual world engine 24 operates to perform typical virtual world operations such as rendering the virtual space including locally hosted virtual objects 30 at client devices, such as client device 20-X, associated with users having avatars within the virtual space hosted by the peer server 18-1. The peer server 18-1 stores or otherwise has access to virtual space properties 32 such as, for example, terrain and weather information enabling the virtual world engine 24 to render the virtual space.

Interest expressions for the locally hosted virtual objects 30 are registered with the peer server 18-1 and stored in a registered interests database 34. The interest manager 26 operates to aggregate the interest expressions of the locally hosted virtual objects 30 from the registered interests database 34 to provide an interest map for the peer server 18-1. In one embodiment, the interest map includes an entry for each message type produced by one or more of the locally hosted virtual objects 30, where each entry includes the message type, an aggregate scope for the message type, and a listing of virtual objects that produce the message type. The interest manager 26 generates the aggregate scope for each message type produced by one or more of the locally hosted virtual objects 30 by aggregating or combining the auras of those virtual objects for the message type from their interest expressions. The interest map also includes an entry for each message type consumed by one or more of the locally hosted virtual objects 30, wherein each entry includes the message type, an aggregate scope for the message type, and a listing of virtual objects that consume the message type. The interest manager 26 generates the aggregate scope for each message type consumed by one or more of the locally hosted virtual objects 30 by aggregating or combining the AOIs of those virtual objects for the message type from their interest expressions.

The peer message handler 28 includes a message receiver 36 that receives messages from the neighboring peer servers 18-2 through 18-7 of the peer server 18-1. An ad/sub message processing and propagation function 38 operates to process and, if appropriate, propagate ad/sub messages received from its neighboring peer servers 18-2 through 18-7 via the message receiver 36 and to update routing table 40 in the manner described above. In addition, the ad/sub message processing and propagation function 38 operates to generate and send ad/sub messages originating at the peer server 18-1 based on the interest map and further update the routing table 40 in the manner described above in order to establish message flow paths for messages produced and consumed by the locally hosted virtual objects 30.

A message routing function 42 operates to route ad/sub messages originating from the peer server 18-1 or further propagate ad/sub messages received by the peer server 18-1 based on the routing table 40. In addition, the message routing function 42 operates to route messages produced by the locally hosted virtual objects 30 to one or more of the neighboring peer servers 18-2 through 18-7 that have expressed an interest in those message types in response to the ad/sub message originating from the peer server 18-1. The message routing function 42 also operates to route messages received from the neighboring peer servers 18-2 through 18-7 according to the routing table 40. More specifically, the routing table 40 is maintained such that messages from the neighboring peer servers 18-2 through 18-7 of message types of interest to the locally hosted virtual objects 30 are routed to the locally hosted virtual objects 30. In addition, messages from, for example, the neighboring peer server 18-2 of message types of interest to others of the neighboring peer servers 18-3 through 18-7 are routed to those peer servers. The messages from the message routing function 42 are sent to the desired ones of the peer servers 18-2 through 18-7 by a message sender 44.

FIG. 10 is a block diagram of the network device 12-1 of FIG. 1 according to one embodiment of the present invention. Note that this discussion is also applicable to other network devices 12-2 through 12-N and 14. In general, the network device 12-1 includes a control system 46. In one embodiment, the peer server 18-1 is at least partially implemented in software and stored in memory 48. However, the present invention is not limited thereto. The peer server 18-1 may be implemented in software, hardware, or a combination thereof. The client 20-1 may also be implemented at least partially in software and stored in the memory 48. However, the present invention is not limited thereto. The network device 12-1 also includes a communication interface 50 communicatively coupling the network device 12-1 to the network 16 (FIG. 1). The network device 12-1 may also include a user interface 52, which may include, for example, a display, speakers, one or more user input devices, and the like.

The present invention provides substantial opportunity for variation without departing front the spirit or scope of the present invention. For example, while the description above focuses on the use of both advertisement and subscription records, the present invention is not limited thereto. As will be apparent to one of ordinary skill in the art, the message propagation paths for messages produced and consumed by virtual objects in the virtual worlds may alternatively be established using only subscription messages, where each of the peer servers 18-1 through 18-N issues only subscription messages identifying message types consumed by virtual objects within its virtual space. As another alternative, only advertisement records may be used to establish the message flow paths where each of the peer servers 18-1 through 18-N issues only advertisement messages identifying message types produced by virtual objects within its virtual space. As another example, while the discussion herein focuses on a P2P virtual world, the present invention is equally applicable to any type of distributed virtual world.

Those skilled in the art will recognize improvements and modifications to the preferred embodiments of the present invention. All such improvements and modifications are considered within the scope of the concepts disclosed herein and the claims that follow.

What is claimed is:

1. A method of defining message flow paths in a distributed virtual world formed by a plurality of peer servers each hosting a virtual space corresponding to a cell of the distributed virtual world, comprising:
   receiving, at a neighboring peer server hosting a virtual space neighboring a virtual space hosted by an originating peer server, a message flow path setup message from the originating peer server identifying a plurality of produced message types produced by at least one virtual object within a virtual space hosted by the originating peer server and a scope of the plurality of produced message types;
   identifying, at the neighboring peer server, ones of the plurality of produced message types that are of interest to the neighboring peer server;
   identifying, at the neighboring peer server, ones of the plurality of produced message types that are of interest to at least one further neighboring peer server of the neighboring peer server;
   providing a response to the originating peer server identifying the ones of the plurality of produced message types that are of interest to the neighboring peer server such that messages of the ones of the plurality of produced message types are subsequently routed from the originating peer server to the neighboring peer server; and
   updating a routing table by the neighboring peer server such that messages of a plurality of consumed message types from the at least one further neighboring peer server of the neighboring peer server are routed to the peer server.

2. The method of claim 1 wherein the ones of the plurality of produced message types that are of interest to the neighboring peer server comprise at least one of the plurality of produced message types consumed by at least one virtual object within the virtual space hosted by the neighboring peer server and within the scope of the at least one of the plurality of produced message types.

3. The method of claim 1 wherein identifying the ones of the plurality of produced message types of interest to the neighboring peer server comprises:
   determining whether at least one virtual object within the virtual space hosted by the neighboring peer server consumes at least one of the plurality of produced message types and is within the scope of the at least one of the plurality of produced message types; and
   if at least one virtual object within the virtual space hosted by the neighboring peer server consumes at least one of the plurality of produced message types and is within the scope of the at least one of the plurality of produced message types, generating the response to the peer server such that the response includes information identifying the at least one of the plurality of produced message types consumed by the at least one virtual object within the virtual space hosted by the neighboring peer server.

4. The method of claim 3 wherein identifying the ones of the plurality of produced message types of interest to the neighboring peer server further comprises:

propagating the message flow path setup message to at least one further neighboring peer server of the neighboring peer server; and further generating the response such that the response further comprises information identifying the at least one of the plurality of produced message types that is of interest to the at least one neighboring peer server.

5. The method of claim 4 wherein, for each one of the at least one neighboring peer server, propagating the message flow path setup message comprises:

filtering the message flow path setup message based on the scope of the plurality of produced message types to remove information identifying ones of the plurality of produced message types having scopes that do not extend into a virtual space hosted by the one of the at least one neighboring peer server to provide a filtered message flow path setup message; and providing the filtered message flow path setup message to the one of the at least one neighboring peer server.

6. The method of claim 4 further comprising updating a routing table of the neighboring peer server such that messages of the at least one of the plurality of produced message types that is of interest to the at least one neighboring peer server received from the originating peer server are routed to the at least one neighboring peer server.

7. The method of claim 1 wherein the message flow path setup message further identifies a plurality of consumed message types that are of interest to the originating peer server and a scope for the plurality of consumed message types, and the method further comprises:

determining whether at least one virtual object within the virtual space hosted by the neighboring peer server produces at least one of the plurality of consumed message types; and if at least one virtual object within the virtual space hosted by the neighboring peer server produces at least one of the plurality of consumed message types and is within the scope of the at least one of the plurality of consumed message types, updating a routing table of the neighboring peer server such that messages of the at least one of the plurality of consumed messages types produced by the at least one virtual object within the virtual space hosted by the neighboring peer server are routed to the originating peer server.

8. The method of claim 7 wherein the plurality of consumed message types comprises at least one message type consumed by at least one virtual object within the virtual space hosted by the originating peer server.

9. The method of claim 7 wherein the plurality of consumed message types comprises at least one message type predicted to be consumed by the at least one virtual object within the virtual space hosted by the originating peer server.

10. The method of claim 7 further comprising:

propagating the message flow path setup message to at least one further neighboring peer server of the neighboring peer server.

11. The method of claim 10 wherein, for each one of at least one neighboring peer server, propagating the message flow path setup message comprises:

filtering the message flow path setup message based on the scope of the plurality of consumed message types to remove information identifying ones of the plurality of consumed message types having a scope that does not extend into a virtual space hosted by the one of the at least one neighboring peer server to provide a filtered message flow path setup message; and providing the filtered message flow setup message to the one of the at least one neighboring peer server.

12. A method of defining message flow paths in a distributed virtual world formed by a plurality of peer servers each hosting a virtual space corresponding to a cell of the distributed virtual world, comprising:

generating, at a peer server, a message flow path setup message identifying a plurality of consumed message types that are of interest to the peer server and a scope of the plurality of consumed message types; and providing the message flow path setup message to at least one neighboring peer server from the plurality of peer servers, the at least one neighboring peer server hosting a virtual space neighboring the virtual space of the peer server in the distributed virtual world;

wherein at least one message flow path for at least one of the plurality of consumed message types is established between at least one of the plurality of peer servers hosting a virtual object that produces the at least one of the plurality of consumed message types and the peer server based on the message flow path setup message and the at least one neighboring peer server propagates the message flow path setup message to at least one further neighboring peer server of the at least one neighboring peer server, and the at least one neighboring peer server updates its routing table such that messages of at least one of the plurality of consumed message types received from the at least one further neighboring peer server are routed to the peer server.

13. The method of claim 12 wherein the at least one neighboring peer server updates its routing table such that messages of at least one of the plurality of consumed message types produced by at least one virtual object within a virtual space hosted by the at least one neighboring peer server and within the scope of the at least one plurality of consumed message types are routed to the peer server.

14. A method of defining message flow paths in a distributed virtual world formed by a plurality of peer servers each hosting a virtual space corresponding to a cell of the distributed virtual world, comprising:

receiving, at a neighboring peer server hosting a virtual space neighboring a virtual space hosted by an originating peer server, a message flow path setup message from the originating peer server identifying a plurality of consumed message types that are of interest to the originating peer server and a scope of the plurality of consumed message types;

determining, at the neighboring peer server, whether at least one virtual object within the virtual space hosted by the neighboring peer server produces at least one of the plurality of consumed message types;

if the at least one virtual object within the virtual space hosted by the neighboring peer server produces at least one of the plurality of consumed message types and is within the scope of the at least one of the plurality of consumed message types, updating a routing table of the neighboring peer server such that messages of the at least one of the plurality of consumed messages types produced by the at least one virtual object within the virtual space hosted by the neighboring peer server are routed to the originating peer server;

determining, at the neighboring peer server, if ones of the plurality of consumed message types are of interest to at least one further neighboring peer server of the neighboring peer server; and updating a routing table by the neighboring peer server such that messages of the plurality of consumed message types received from the at least one further neighboring peer server of to a neighboring peer server are routed to the originating peer server.

15. The method of claim 14 further comprising:
propagating the message flow path setup message to at least one further neighboring peer server of the neighboring peer server.

16. A system comprising:
a) a communication interface communicatively coupling the system to a network; and
b) a control system associated with the communication interface and including a peer server hosting a virtual space of a distributed virtual world formed by a plurality of peer servers including the peer server each hosting a virtual space corresponding to a cell of the distributed virtual world, the peer server configured to:
   i) receive, from an originating peer server hosting a virtual space neighboring the virtual space hosted by the peer server, a message flow path setup message identifying a plurality of produced message types produced by at least one virtual object within the virtual space hosted by the originating peer server and a scope of the plurality of produced message types;
   ii) identify ones of the plurality of produced message types that are of interest to the peer server;
   iii) identify ones of the plurality of produced message types that are of interest to at least one further neighboring peer server of the neighboring peer server;
   iv) provide a response to the originating peer server identifying the ones of the plurality of produced message types of interest to the peer server such that messages of the ones of the plurality of produced message types are subsequently routed from the originating peer server to the peer server; and
   v) update a routing table such that messages of the plurality of consumed message types from the at least one further neighboring peer server of the neighboring peer server are routed to the peer server.

17. A system comprising:
a) a communication interface communicatively coupling the system to a network; and
b) a control system associated with the communication interface and including a peer server hosting a virtual space of a distributed virtual world formed by a plurality of peer servers including the peer server each hosting a virtual space corresponding to a cell of the distributed virtual world, the peer server configured to:
   i) receive, from an originating peer server hosting a virtual space neighboring the virtual space hosted by the peer server, a message flow path setup message identifying a plurality of consumed message types that are of interest to the originating peer server and a scope of the plurality of consumed message types;
   ii) determine whether at least one virtual object within the virtual space hosted by the peer server produces at least one of the plurality of consumed message types;
   iii) if the at least one virtual object within the virtual space hosted by the peer server produces at least one of the plurality of consumed message types and is within the scope of the at least one of the plurality of consumed message types, update a routing table of the peer server such that messages of the at least one of the plurality of consumed message types produced by the at least one virtual object within the virtual space hosted by the peer server are routed to the originating peer server;
   iv) determine if ones of the plurality of consumed message types are of interest to at least one further neighboring peer server of the neighboring peer server; and
   v) update a routing table such that messages of the plurality of consumed message types received from the at least one further neighboring peer server of the neighboring peer server are routed to the originating peer server.

18. The system of claim 17 wherein the peer server is further configured to:
propagate the message flow path setup message to at least one neighboring peer server of the peer server.

* * * * *